US007913080B2

(12) United States Patent
Taniguchi et al.

(10) Patent No.: US 7,913,080 B2
(45) Date of Patent: Mar. 22, 2011

(54) SETTING INFORMATION DISTRIBUTION APPARATUS, METHOD, PROGRAM, AND MEDIUM, AUTHENTICATION SETTING TRANSFER APPARATUS, METHOD, PROGRAM, AND MEDIUM, AND SETTING INFORMATION RECEPTION PROGRAM

(75) Inventors: Hiroyuki Taniguchi, Kawasaki (JP); Izuru Sato, Kawasaki (JP); Takeshi Ohnishi, Fukuoka (JP); Markus Schneider, Darmstadt (DE)

(73) Assignee: Fujitsu Limited, Kawasaki (JP)

( * ) Notice: Subject to any disclaimer, the term of this patent is extended or adjusted under 35 U.S.C. 154(b) by 1343 days.

(21) Appl. No.: 11/227,170

(22) Filed: Sep. 16, 2005

(65) Prior Publication Data
US 2006/0117104 A1     Jun. 1, 2006

(30) Foreign Application Priority Data

Sep. 17, 2004  (DE) .......................... 10 2004 045 147

(51) Int. Cl.
*H04L 29/06* (2006.01)
*H04L 9/32* (2006.01)
*H04N 7/167* (2006.01)

(52) U.S. Cl. ........ 713/155; 713/156; 713/159; 713/168; 713/170; 380/229

(58) Field of Classification Search .................. 713/169, 713/155, 156, 159, 168, 170; 380/229
See application file for complete search history.

(56) References Cited

U.S. PATENT DOCUMENTS

| | | | | |
|---|---|---|---|---|
| 6,233,577 | B1 * | 5/2001 | Ramasubramani et al. ...... | 707/9 |
| 6,275,859 | B1 * | 8/2001 | Wesley et al. ................. | 709/229 |
| 6,275,941 | B1 * | 8/2001 | Saito et al. .................... | 726/2 |
| 7,308,574 | B2 * | 12/2007 | Dare et al. .................... | 713/157 |
| 2001/0044894 | A1 * | 11/2001 | Saito et al. .................... | 713/156 |
| 2004/0177281 | A1 | 9/2004 | Balaz et al. | |
| 2006/0072527 | A1 * | 4/2006 | Beck et al. .................... | 370/338 |

FOREIGN PATENT DOCUMENTS

| | | |
|---|---|---|
| EP | 1 162 807 | 1/2004 |
| EP | 1 484 856 | 12/2004 |
| GB | 2 345 620 | 7/2000 |
| GB | 2 369 530 | 5/2002 |
| WO | WO 00/62484 | 10/2000 |
| WO | WO 03/077467 | 9/2003 |
| WO | WO 03105049 A1 * | 12/2003 |
| WO | WO 2004/036823 | 4/2004 |

OTHER PUBLICATIONS

German Search Report, dated Jan. 9, 2006 and Feb. 22, 2006, for related German Patent Application No. GB0518459.3.

* cited by examiner

*Primary Examiner* — Nasser Moazzami
*Assistant Examiner* — Mohammad W Reza
(74) *Attorney, Agent, or Firm* — Staas & Halsey LLP

(57) ABSTRACT

A setting information distribution apparatus belonging to a first network, comprises: authentication unit that receives and authenticates an authentication request from a user terminal which requires an access authentication by using a network access authentication procedure between the user terminal and the first network; transmitting unit that transmits an authentication cooperation request which requires setting data to be set to the user terminal to another, network by using the network access authentication procedure and an authentication cooperation procedure between a plurality of networks; and distribution unit that distributes a first response message added with setting data to the user terminal by producing the first response message corresponding to the authentication request by adding the setting data included in a second response message corresponding to the authentication cooperation request.

55 Claims, 30 Drawing Sheets

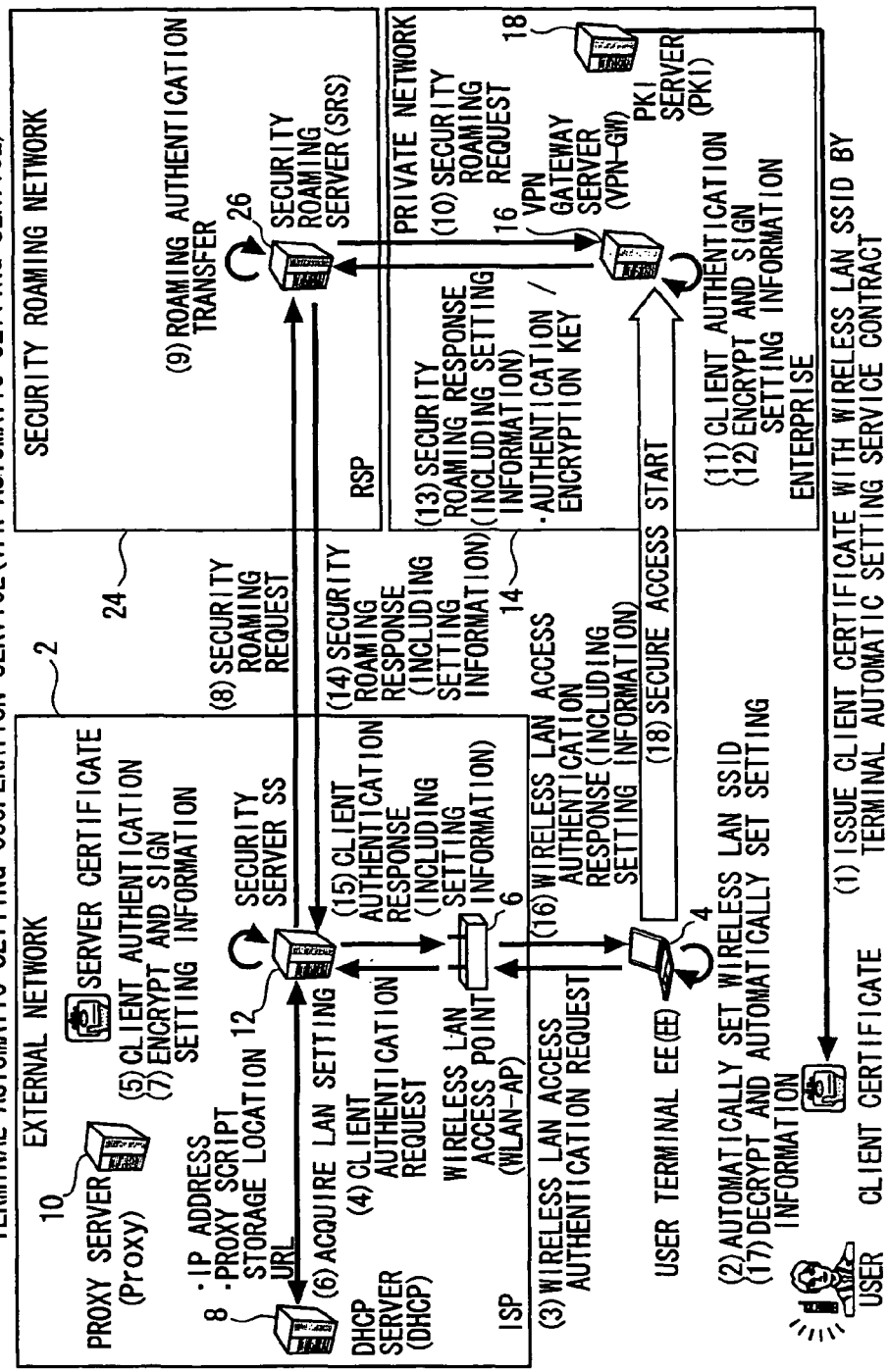

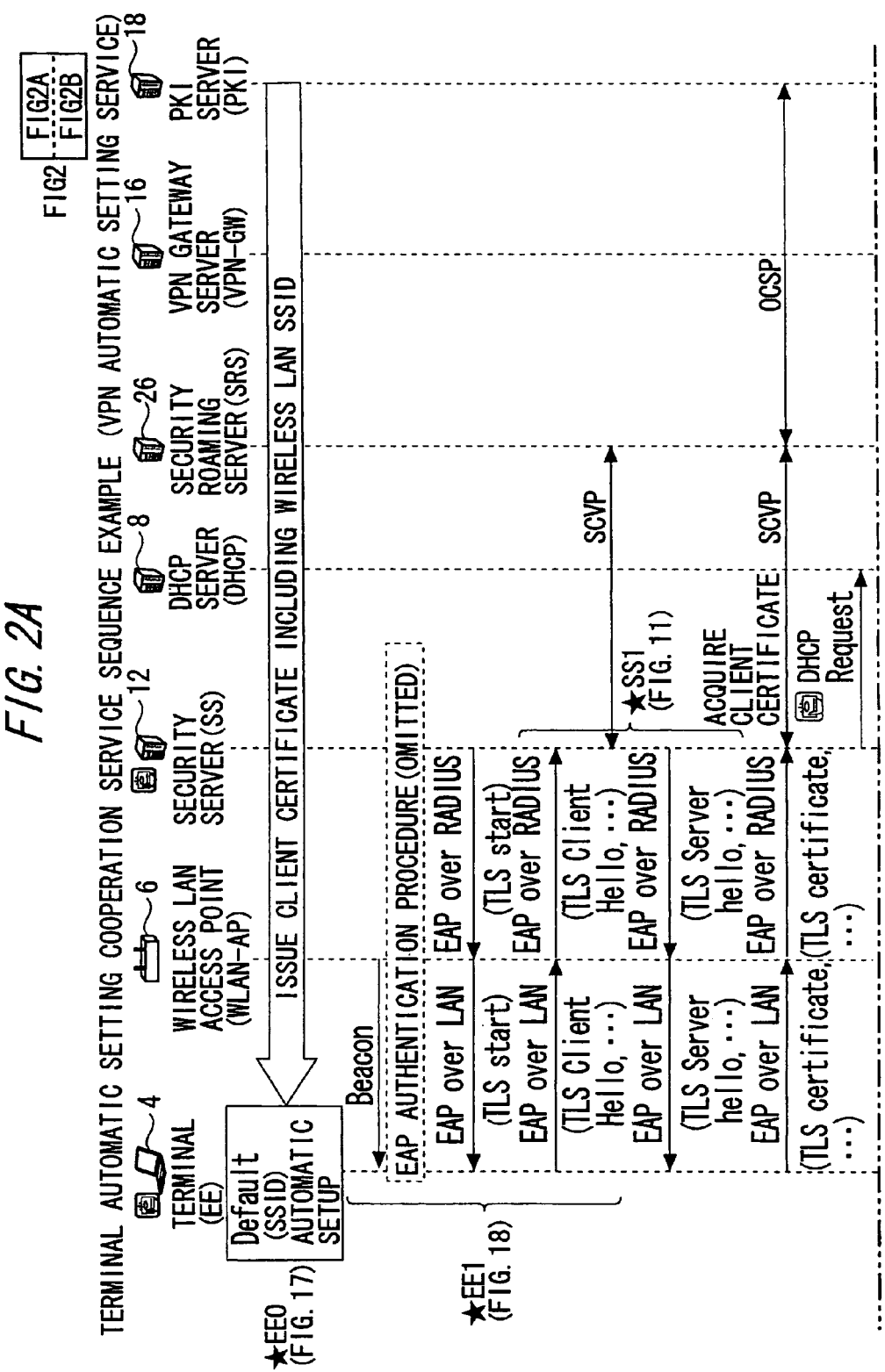

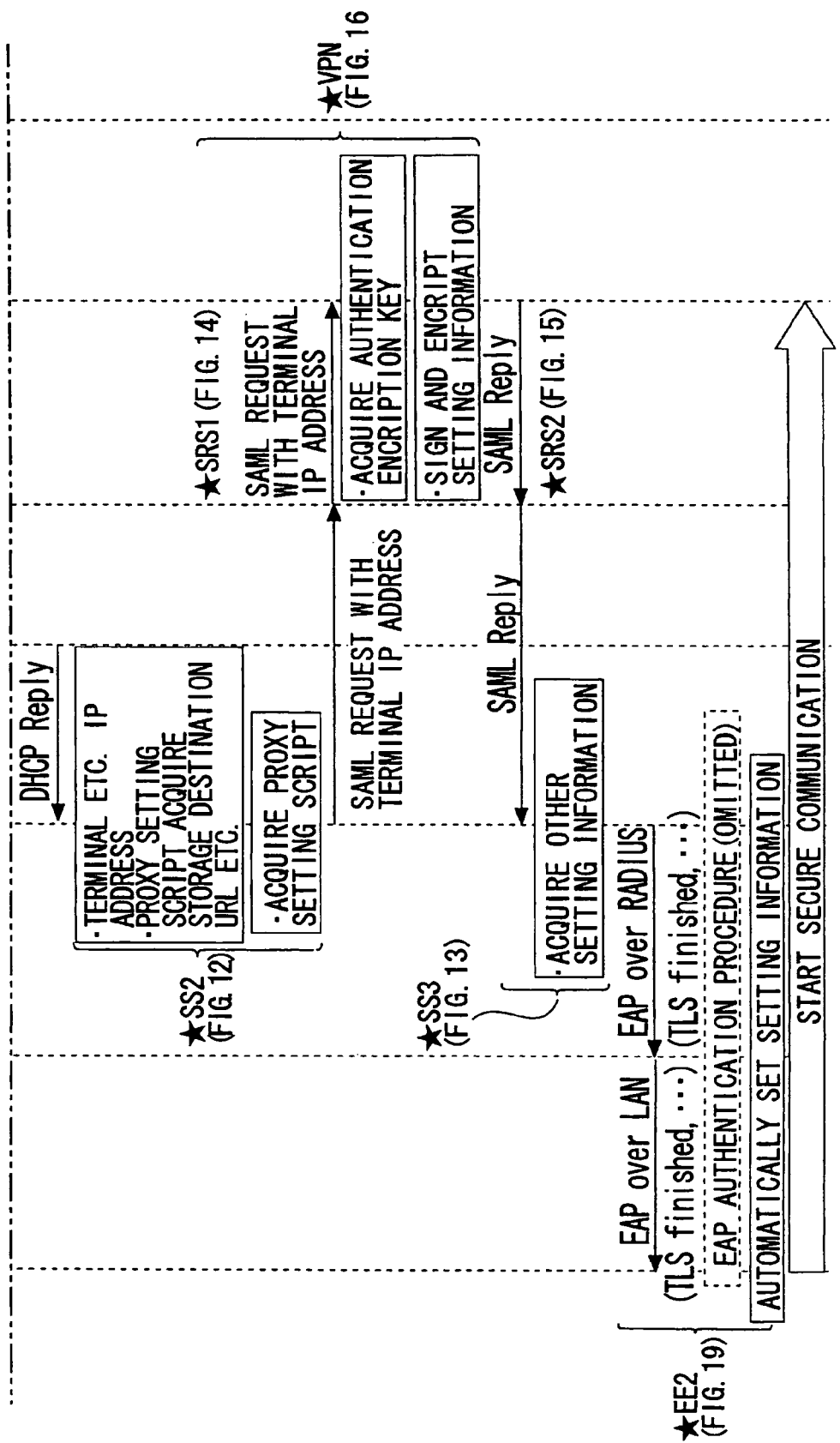

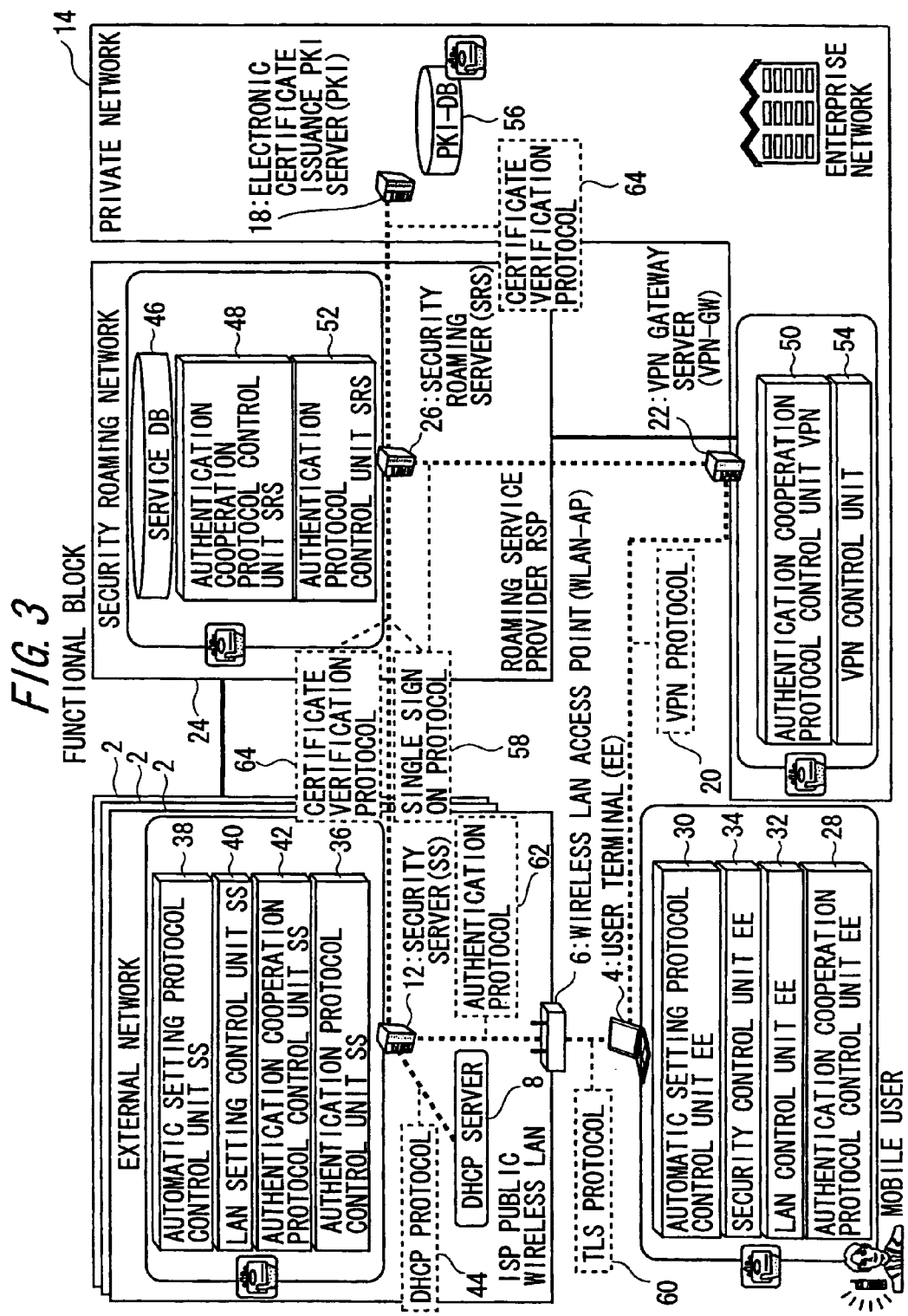

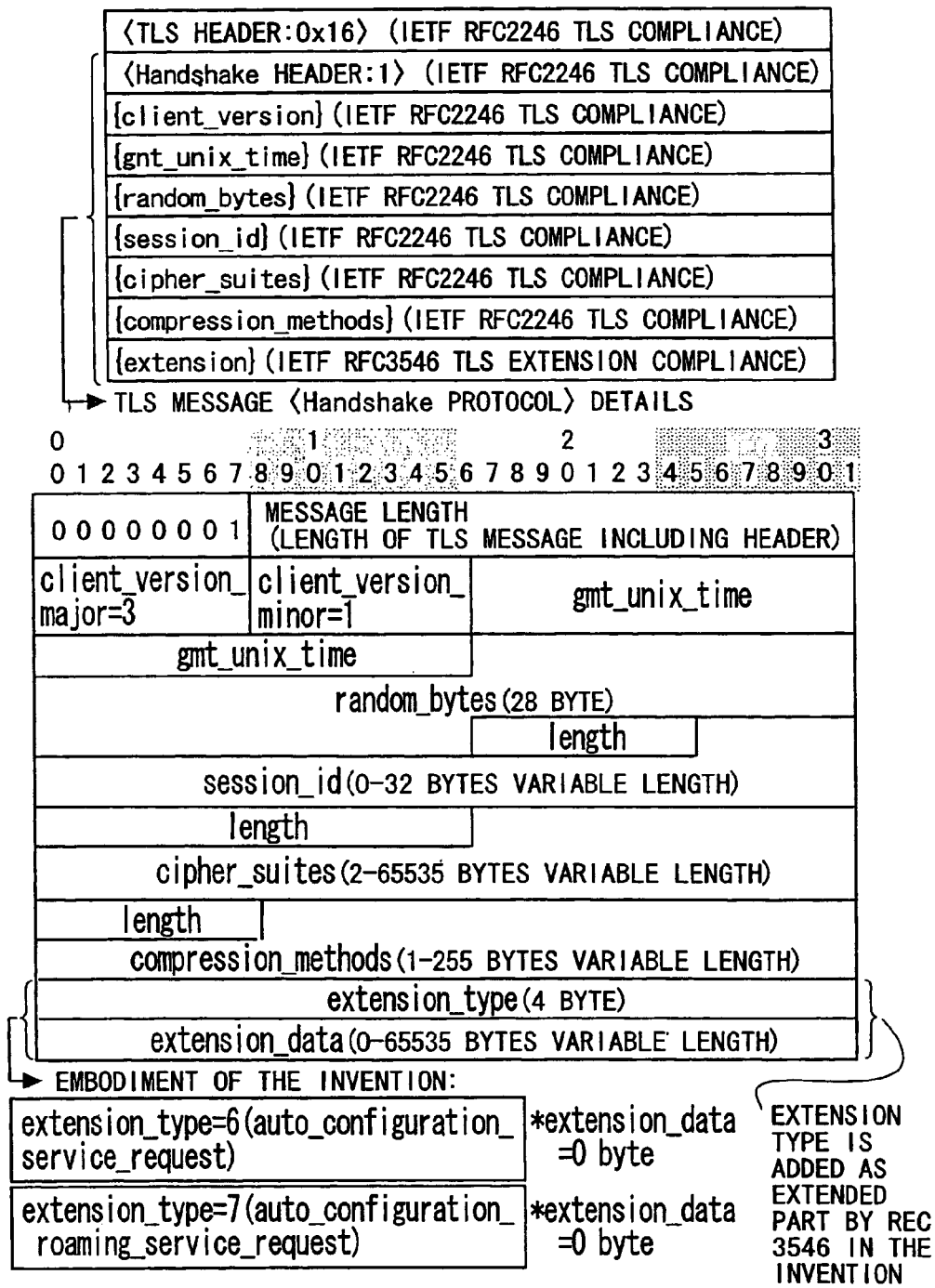

FIG. 5A
TLS EXTENSION PROTOCOL STRUCTURE (SERVER FINISHED)
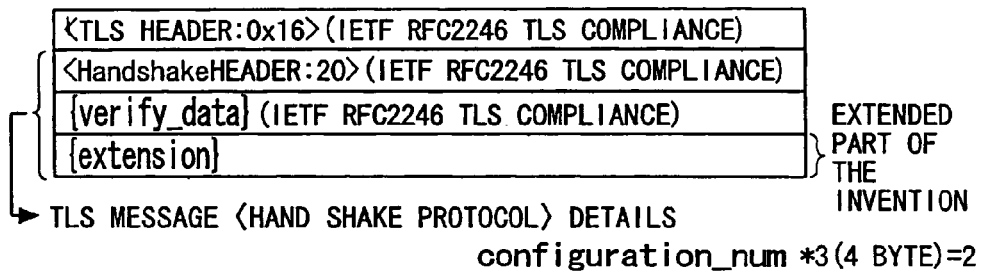
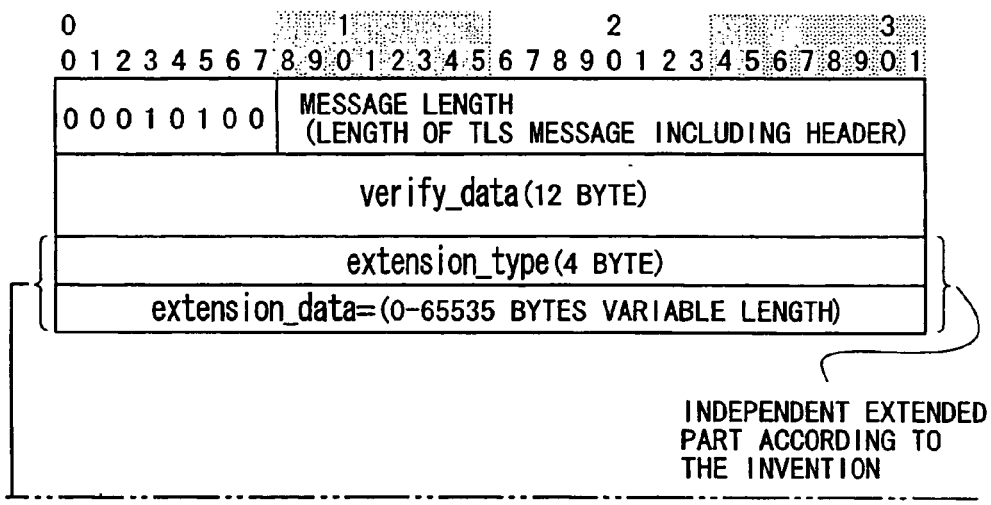

FIG. 5B

↳ EMBODIMENT OF THE INVENTION:

| extension_type*1=6(auto_configuration_service_request) ||
|---|---|
| extension_size*2 (0-65535 BYTES VARIABLE LENGTH) ||
| configuration_network_num *9 (4 BYTE)=3 ||
| network_number *10=1(ISP) | configuration_num *3(2 BYTE)=1 |
| configuration_type *4=1(DHCP) | priority *5=Z    number *6=1 |
| configuration_size *7=(0-65535 BYTES VARIABLE LENGTH) ||
| configuration_data *8={Terminal IP address, subnetmask, Gateway IP address, primary DNS IP address, secondly DNS IP address, Domain name, Lifetime, ···} ||
| network_number *10=2(ENTERPRISE) | configuration_num *3(2 BYTE)=1 |
| configuration_type=2(IKE) | priority=A    number=1 |
| configuration_size=(0-65535 BYTES VARIABLE LENGTH) ||
| configuration_data={Security configuration} ||

| | | |
|---|---|---|
| *1 | extension_type | :EXTENSION TYPE |
| *2 | extension_size | :EXTENSION DATA SIZE |
| *3 | configuration_num | :NUMBER OF PIECES OF SETTING DATA |
| *4 | configuration_type | :KIND OF SETTING DATA |
| *5 | priority | :SETTING PRIORITY (A:PRIORITY, B: NON-PRIORITY, C: SETUP UPON STARTUP OF APPLICATION, Z: FINAL SETUP OF PROCESSING SETUP) |
| *6 | number | :RANKING (1-225:SETUP IS PERFORMED IN THE ORDER FROM"1") |
| *7 | configuration_size | :SETTING DATA SIZE (BYTE) |
| *8 | configuration_data | :SETTING DATA ITSELF |
| *9 | configuration_network_num | :NUMBER OF SETTING NETWORKS |
| *10 | configuration_type | :KIND OF SETTING NETWORK |

SAML REQUEST MESSAGE EXAMPLE 1 (ISP→RSP)

```
<samlp:Request
MajorVersion="1"MinorVersion="0"
IssueInstant="UTC Data/Time"
RequestID="128.14.234.20.12345678"
RespondWith0="AuthorizationDecisionStatement">
  <samlp:AuthorizationDecisionQuery
    Resource="SRS">
    <saml:Action> roaming </saml:Action>          } INDICATE COOPERATION REQUEST TO RSP
    <saml:Evidence>                                } INDICATE ROAMING CONNECTION REQUEST
      <saml:Assertion>
        <saml:AuthenticationStatement
          AuthenticationMethod="...URI..."
          AuthenticationInstant="2004-12-03T10:02:00Z">   } INDICATE AUTHENTICATION ASSERTER
          <saml:Subject>
```

FIG. 6B

```
<saml:NameIdentifier
 SecurityDomain="OOOO.com"
 Name="tarouser"/>
<saml:SubjectConfirmation>
 <saml:ConfirmationMethod>
  Cipher Suite
 </saml:ConfirmationMethod>
 <saml:SubjectConfirmationData>
  Signed TLS handshake messages(base64)
  tag
  Signature(base64)
  ISP-LAN
  ClientAddress="128.14.234.20"
 </saml:SubjectConfirmationData>
</saml:SubjectConfirmation>
     </saml:Subject>
    </saml:AuthenticationStatement>
   </saml:Assertion>
  </samlp:Evidence>
 </samlp:AuthorizationDecisionQuery>
</samlp:Request>
```

- INDICATE AUTHENTICATION DATA (Cipher Suite through Signature)
- INDICATE LAN SETTING INFORMATION OF ISP (ISP-LAN, ClientAddress)

SAML REQUEST MESSAGE EXAMPLE 2 (ENTERPRISE→NETWORK)

```
<samlp:Request
MajorVersion="1"MinorVersion="0"
IssueInstant="UTC Data/Time"
RequestID="128.14.234.20.12345678"
RespondWith0="AuthorizationDecisionStatement">
 <samlp:AuthorizationDecisionQuery
  Resource="Server1">
  <saml:Action> vpnconnect </saml:Action>
  <saml:Evidence>
   <saml:Assertion>
    <saml:AuthenticationStatement
     AuthenticationMethod="...URI..."
     AuthenticationInstant="2004-12-03T10:02:00Z">
     <saml:Subject>
```

- } INDICATE COOPERATION REQUEST TO ENTERPRISE
- } INDICATE VPN CONNECTION REQUEST
- } INDICATE AUTHENTICATION ASSERTER

FIG. 7B

```
<saml:NameIdentifier
SecurityDomain="OOOO.com"
Name="tarouser"/>
<saml:SubjectConfirmation>
  <saml:ConfirmationMethod>
  Cipher Suite
  </saml:ConfirmationMethod>
  <saml:SubjectConfirmationData>
  Signed TLS handshake messages (base64)
  tag
  Signature (base64)
  ISP-LAN
  ClientAddress="128.14.234.20"
  </saml:SubjectConfirmationData>
</saml:SubjectConfirmation>
    </saml:Subject>
   </saml:AuthenticationStatement>
  </saml:Assertion>
 </saml:Evidence>
</samlp:AuthorizationDecisionQuery>
</samlp:Request>
```

INDICATE AUTHENTICATION DATA

INDICATE LAN SETTING INFORMATION OF ISP

FIG. 8A

SAML RESPONSE MESSAGE EXAMPLE 1 (ENTERPRISE NETWORK→RSP)

```
<samlp:Response
  MajorVersion="1"MinorVersion="0"
  IssueInstant="UTC Data/Time"
  ResponseID="128.14.234.20.90123456"
  InResponseTo="128.14.234.20.12345678"
  StatusCode="Success">
  <saml:Assertion
    MajorVersion="1"MinorVersion="0"
    AssertionID="128.9.167.32.12345678"
    Issuer="Server1"
    <saml:Conditions
      NotBefore="2004-12-03T10:00:00Z"
      NotAfter="2004-12.03T10:05:00Z"/>
    <saml:AuthorizationDecisionStatement    ⎫ INDICATE ENTERPRISE NETWORK
      Resource="Server1"                    ⎬
      Decision="Permit">                    ⎭ INDICATE AUTHENTICATION RESULT
      <saml:Subject>
        <saml:SubjectConfirmation>
```

```
<saml:ConfirmationMethod>
Cipher Suite
</saml:ConfirmationMethod>
<saml:SubjectConfirmationData>
IPsec
 ClientAddress="128.14.234.20"
 ServerAddress="191.165.241.15"
 ClientTunnelAddress="191.165.241.51"
 ServerTunnelAddress="191.165.241.30"
 DNSAddress="191.165.241.4"
 ESPProtocol="3DES"
 ESPSPI="FF FF FF FF"
 ESPKey="hex"
 ESPSoftLifeTime="60"
 ESPHardLifeTime="120"
 ServerCewtificate="...."
</saml:SubjectConfirmationData>
</saml:SubjectConfirmation>
</saml:Subject>
<saml:Action> vpnconnect </saml:Action>
</saml:AuthorizationDecisionStatement>
</saml:Assertion>
</samlp:Responce>
```

} INDICATE AUTHENTICATION DATA

} INDICATE SETTING INFORMATION
  ※ENCRYPTED BY ENTERPRISE NETWORK

} INDICATE THAT VPN CONNECTION PROCESSING WAS PERFORMED

FIG. 9A

SAML RESPONSE MESSAGE EXAMPLE 2 (RSP→ISP)

```
<samlp:Response
 MajorVersion="1"MinorVersion="0"
 IssueInstant="UTC Data/Time"
 ResponseID="128.14.234.20.90123456"
 InResponseTo="128.14.234.20.12345678"
 StatusCode="Success">
 <saml:Assertion
  MajorVersion="1"MinorVersion="0"
  AssertionID="128.9.167.32.12345678"
  Issuer="SRS">
  <saml:Conditions
   NotBefore="2004-12-03T10:00:00Z"
   NotAfter="2004-12.03T10:05:00Z"/>
  <saml:AuthorizationDecisionStatement
   Resource="RSP"                                    ⎫ INDICATE RSP
   Decision="Permit">                                ⎬ INDICATE AUTHENTICATION RESULT
   <saml:Subject>
    <saml:SubjectConfirmation>
     <saml:ConfirmationMethod>
      Cipher Suite                                   ⎫
     </saml:ConfirmationMethod>                      ⎬ INDICATE AUTHENTICATION DATA
    <saml:SubjectConfirmationData>                   ⎭
```

```
Resource=Server1
Confirmation
 IPsec Priority=A                                    ⎫
  ClientAddress="128.14.234.20"                      ⎬ INDICATE ENTERPRISE NETWORK
  ServerAddress="191.165.241.15"                     ⎫
  ClientTunnelAddress="191.165.241.51"               ⎬ INDICATE AUTHENTICATION DATA BY
  ServerTunnelAddress="191.165.241.30"                 ENTERPRISE NETWORK (ACTUAL FORMAT
  DNSAddress="191.165.241.4"                           IS THE SAME AS CIPHER SUITE)
  ESPProtocol="3DES"
  ESPSPI="FF FF FF FF"                               ⎫
  ESPKey="hex"                                       ⎬ INDICATE SETTING INFORMATION
  ESPSoftLifeTime="60"                                 ※ENCRYPTED BY ENTERPRISE NETWORK
  ESPHardLifeTime="120"
  ServerCertificate="..."
   </saml:SubjectConfirmationData>
  </saml:SubjectConfirmation>
 </saml:Subject>
 <saml:Action> roaming </saml:Action>                } INDICATE THAT ROAMING PROCESSING WAS
                                                       PERFORMED
 </saml:AuthorizationDecisionStatement>
</saml:Assertion>
</samlp:Responce>
```

FIG. 10A

ELECTRONIC CERTIFICATE FORMAT (ASN. 1)

```
Certificate::=SEQUENCE {
    tbsCertificate      TBSCertificate,
    signatureAlgorithm  AlgorithmIdentifier,
    signatureValue      BIT STRING}

TBSCertificate::=SEQUENCE {
    Version             EXPLICIT Version,
    serialNumber        CertificateSerialNumber,
    signature           AlgorithmIdentifier,
    issuer              Name,
    validity            Valodity,
    subject             Name,
    subjectPublicKeyInfo  SubjectPublicKeyInfo,
    extensions          EXPLICIT Extensions OPTIONAL}
Version::=INTEGER {v1(0), v2(1), v3(2)}
CertificateSerialNumber::=INTEGER
Validity::=SEQUENCE {
    notBefore Time, notAfter Time}
Time::=CHOICE {
    utcTime UTCTime, generalTime GeneralizedTime}
subjectPublicKeyInfo::=SEQUENCE {
    algorithm AlgorithmIdentifier, subjectPublicKey BIT STRING}
Extensions::=SEQUENCE SIZE(1..MAX) OF Extension
```

```
Extension::=SEQUENCE {
    extnID      OBJECT IDENTIFIER,
    critical    BOOLEAN DEFAULT FALSE,
    roanconf    BOOLEAN DEFAULT TRUE,        } ADD THE FOLLOWING
    ssid        Name,                          INFORMATION BY USING
    extValue    RSextension}                   EXTENSION OF X.509
                                               VERSION 3
                                               · ROAMING AUTOMATIC
                                                 SETTING SERVICE
                                                 APPROVAL
                                               · WIRELESS LAN SSID
                                               · SERVICE APPROVAL
                                                 INFORMATION RSExtension::=CHOICE {
    ipServices IpServices, vpnServices VpnServices}
ipServices::=SEQUENCE {
    permDestinations PermDestinations, day Days, daytime Daytime, pri Priority}
VpnServices::=SEQUENCE {
    permDestinations PermDestinations, day Days, daytime Daytime, pri Priority}
Days::=SET OF Day
Day::=ENUMERATED {
    Monday(0), Tuesday(1), wednesday(2), Thursday(3), Friday(4), Saturday(5), Sunday(6)}
Daytime==SEQUENCE {
    notBeforeHour Time, notAfterHour Time}
PermDistinations::=CHOICE {
    Server1(0), Server2(1), Server3(2), Server4(3)}
Priority::=CHOICE {
    S(0), A(1), B(2), C(3), Z(4)}
```

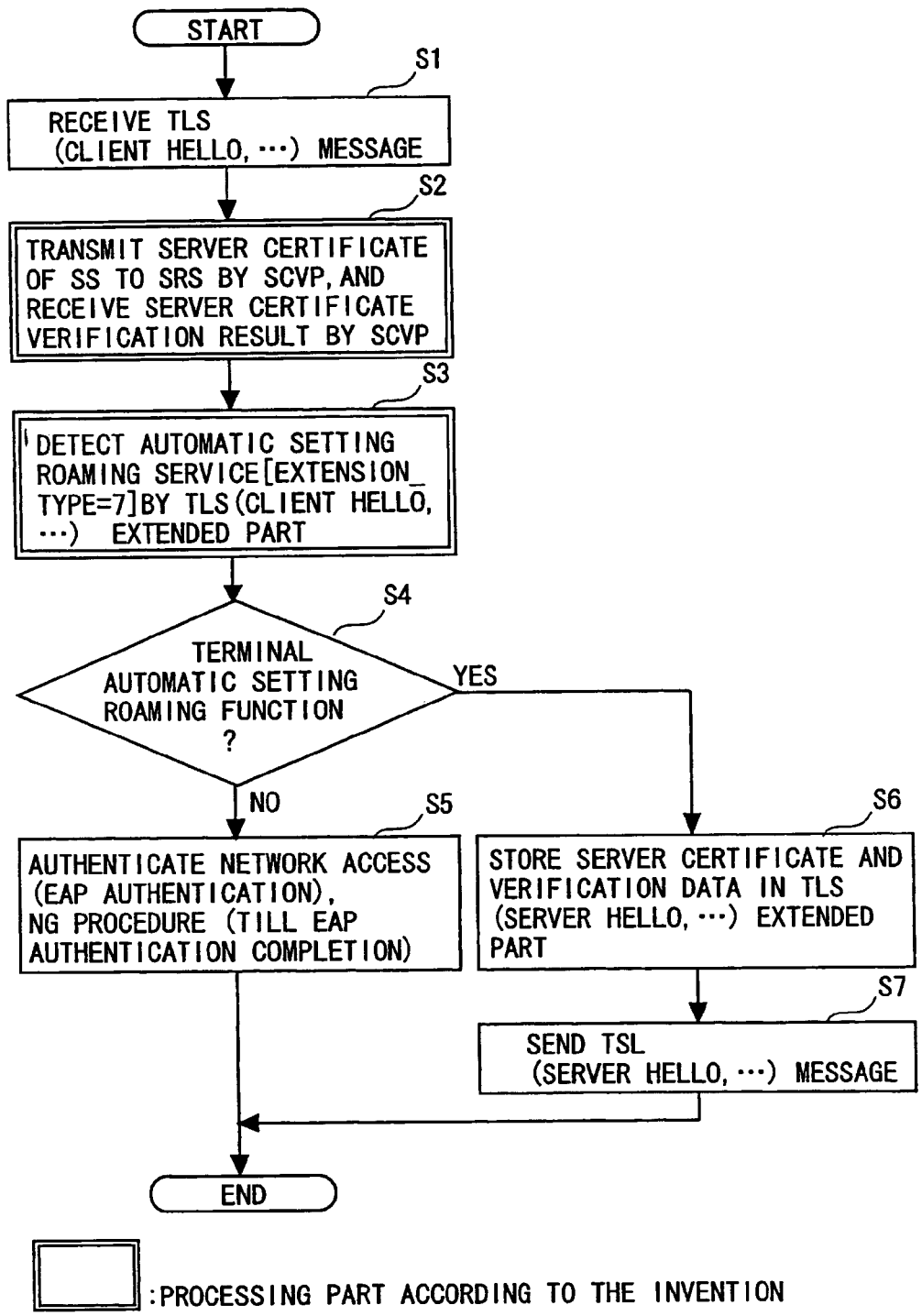

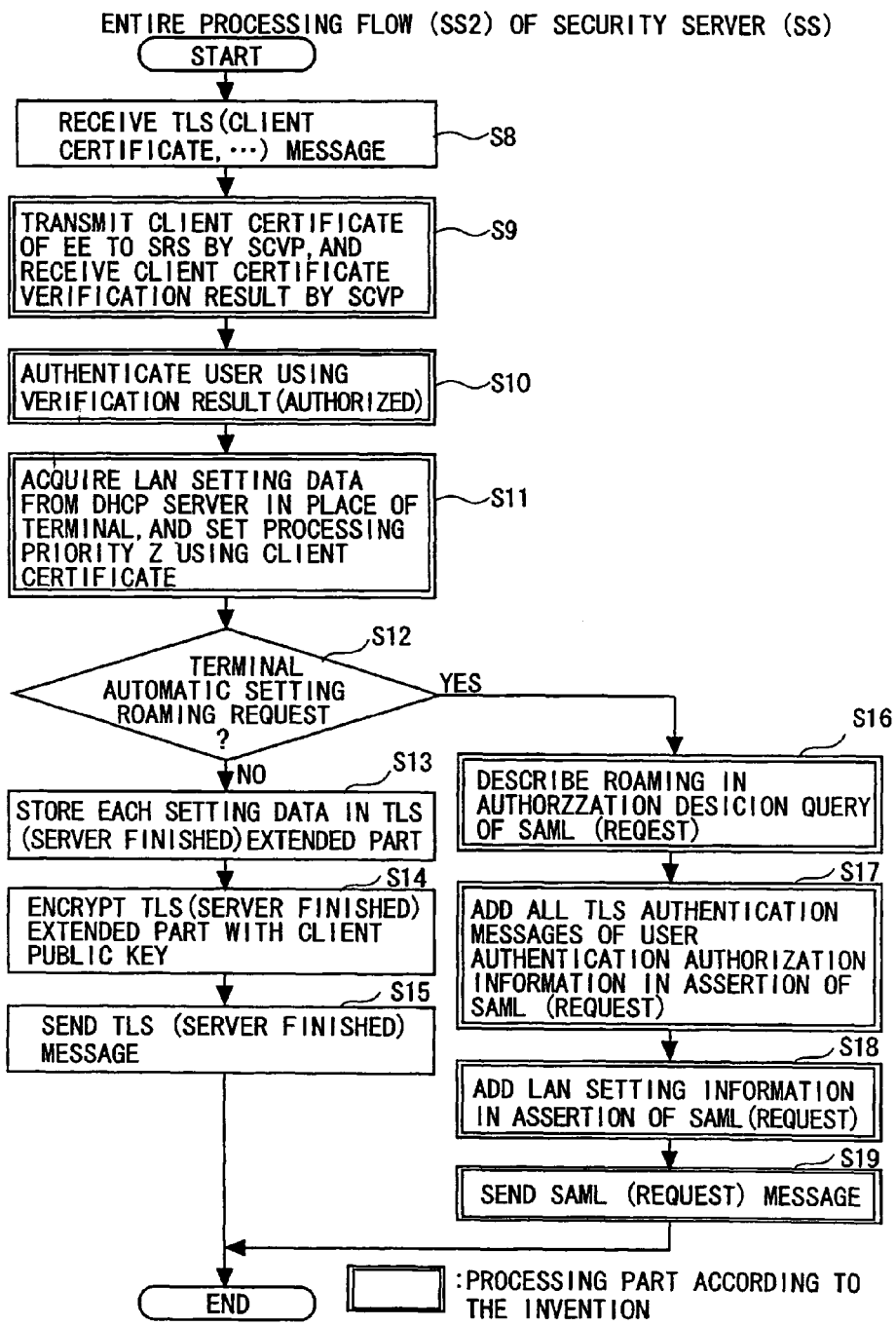

FIG. 13
ENTIRE PROCESSING FLOW (SS3) OF SECURITY SERVER (SS)
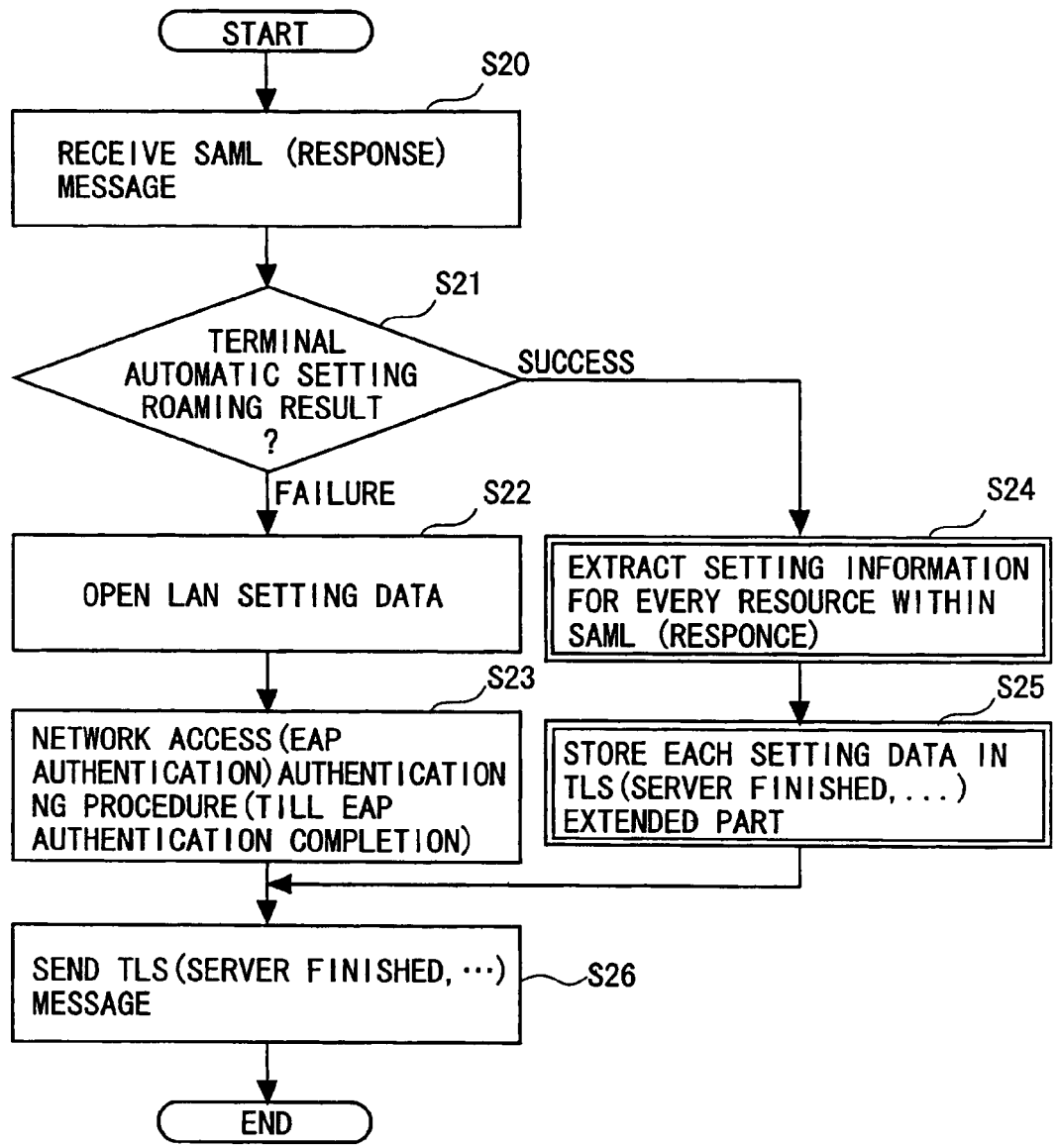
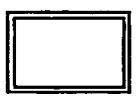 : PROCESSING PART ACCORDING TO THE INVENTION

ENTIRE PROCESSING FLOW (SRS1) OF SECURITY ROAMING SERVER (SRS)

FIG. 15
ENTIRE PROCESSING FLOW (SRS2) OF SECURITY ROAMING SERVER (SRS)
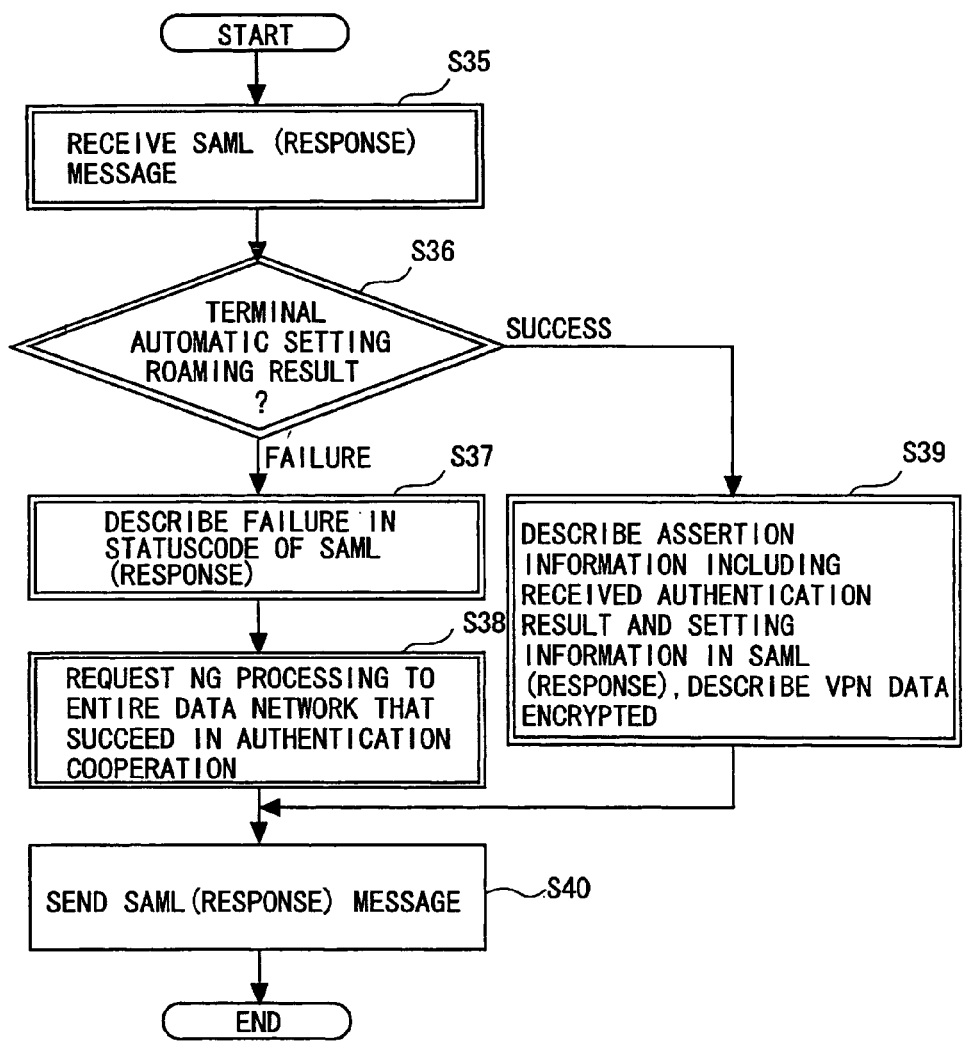
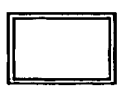 : PROCESSING PART ACCORDING TO THE INVENTION

VPN KEY CREATION SEQUENCE BY NONCE

INFORMATION CONTAINED IN AUTHENTICATION MESSAGE
:nonce=($id_U$, time, client_random, server_random)

VPN KEY CREATING METHOD: key=hash($s_U$, nonce)

| VPN FLAG | IP ADDRESS OF VPN GATEWAY SERVER |
|---|---|
| 1 | 10.25.192.15 |
| 2 | 10.25.193.11 |
| 3 | 10.25.194.10 |
| ⋮ | ⋮ |

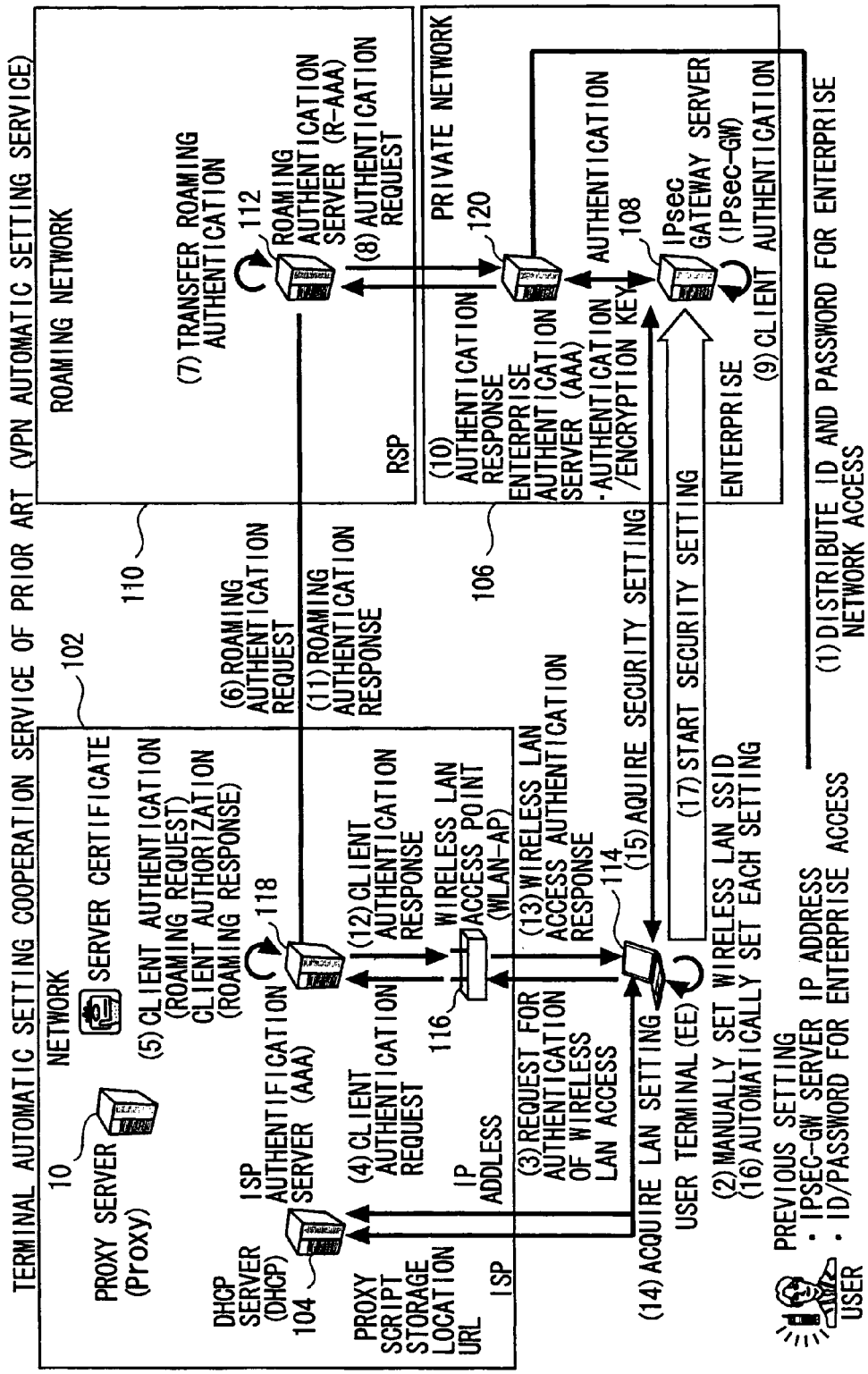

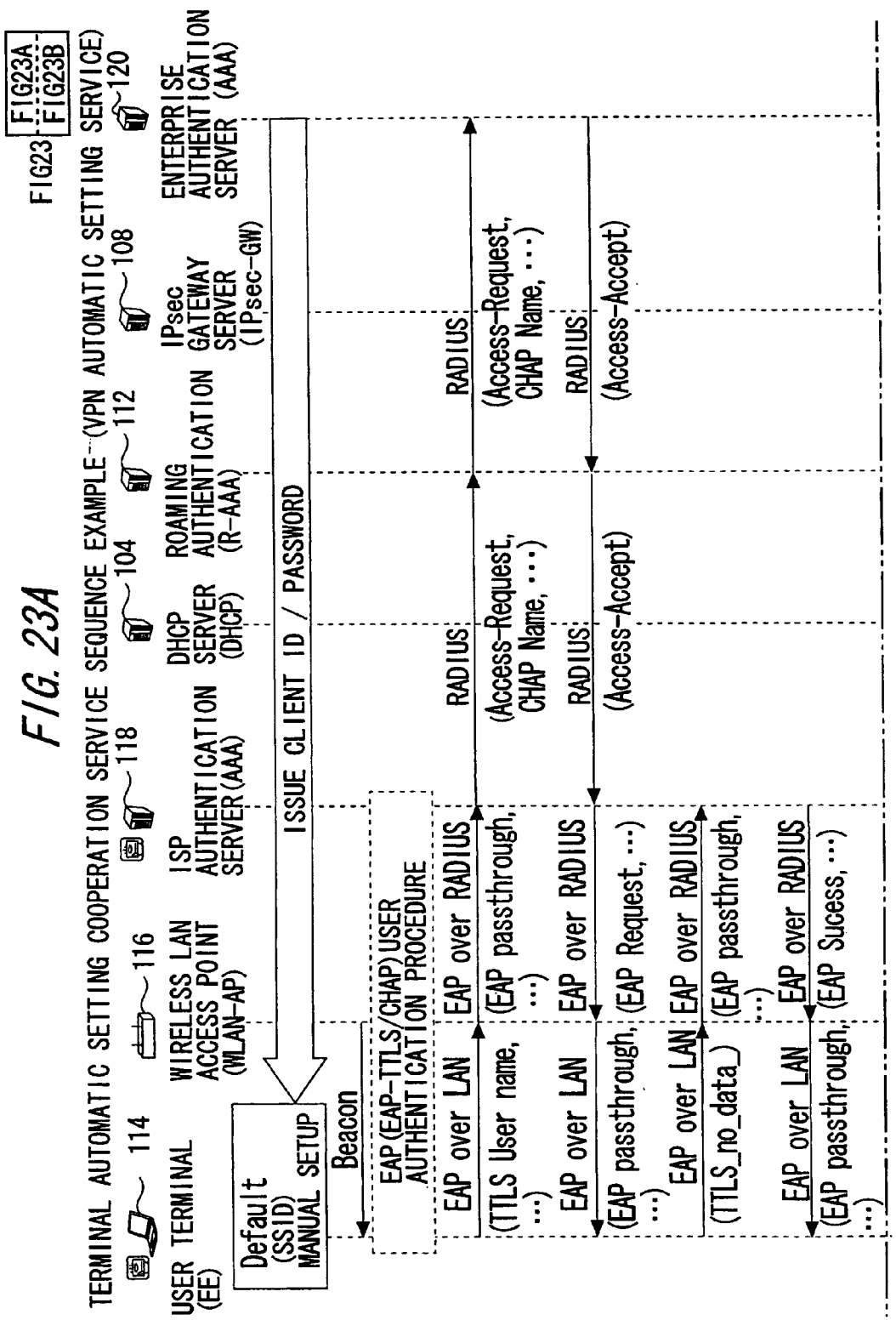

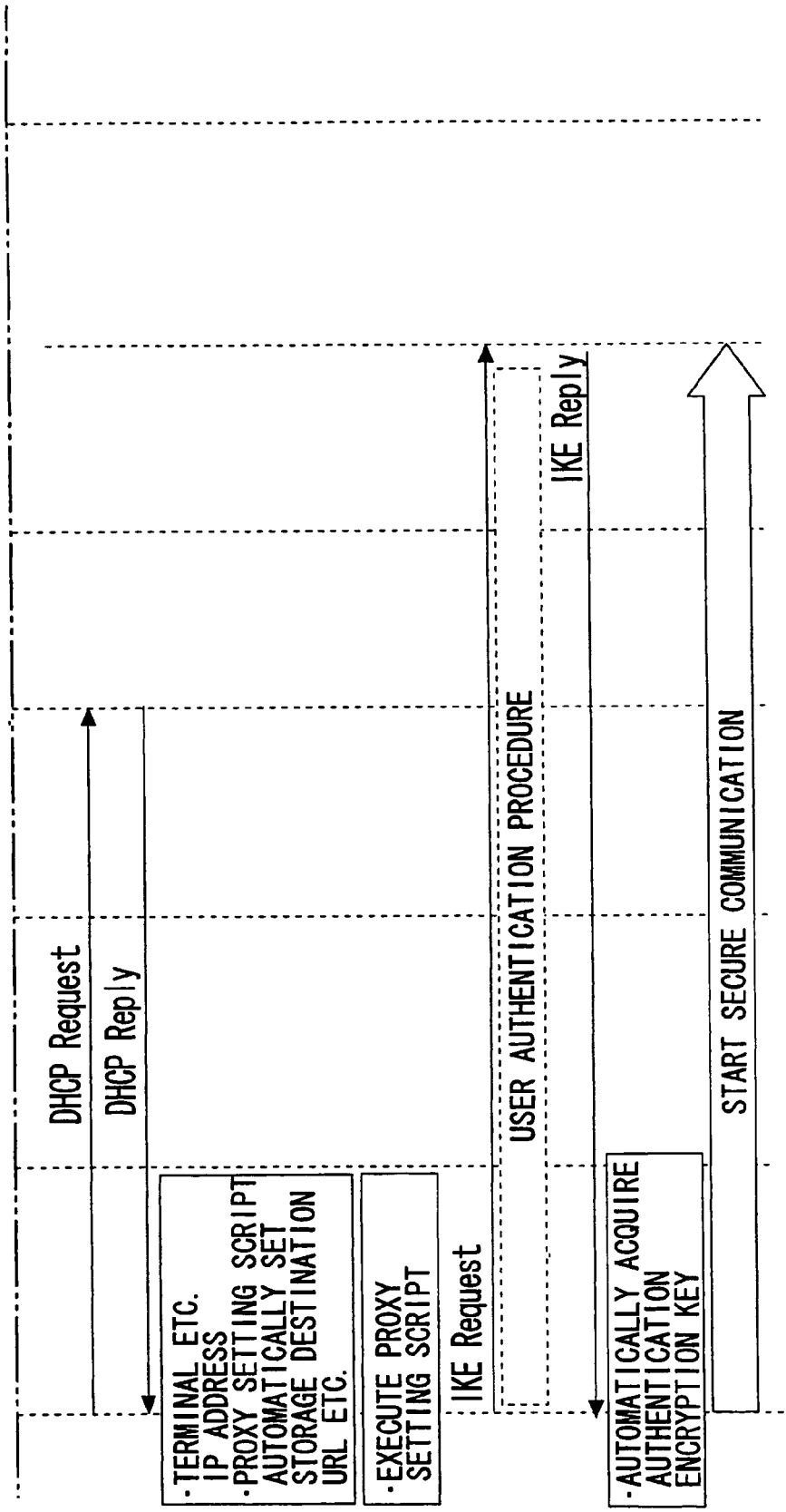

SETTING INFORMATION DISTRIBUTION APPARATUS, METHOD, PROGRAM, AND MEDIUM, AUTHENTICATION SETTING TRANSFER APPARATUS, METHOD, PROGRAM, AND MEDIUM, AND SETTING INFORMATION RECEPTION PROGRAM

BACKGROUND OF THE INVENTION

The invention relates to a setting information distribution apparatus, method, program, and medium, an authentication setting transfer apparatus, method, program, and medium, and a setting information reception program.

In recent years, with an increase in various networks that are represented by an IMT-2000 system and a wireless LAN and the spread of information user terminals such as a personal computer (hereinafter referred to as "PC") having a radio communication function or a personal digital assistance (hereinafter referred to as "PDA"), environments where various services can be used by connection with a network anytime and anywhere are being improved.

The networks and services are run by a plurality of provider domains and systems, and a user contracts with each provider and uses various services. It is general to remotely access to a private network such as an enterprise network from the network having a public wireless LAN by using such environments.

An increase in crimes using the networks such as spoofing or eavesdropping is apprehended simultaneously with the expansion of the users using a service over a network, with the result that the users themselves are required to perform the security measures. As the security measures, it is general that detection application (program or program product) as a virus/worm measure is installed into a user terminal that is connected to the network. It is also general that a fire wall as an intrusion measure, an encryption application as a tapping measure, and an authentication function are installed into the user terminal. Moreover, the network side in turn encrypts radio signals in consideration of the security between users in public wireless LAN, etc.

However, in the security measures, since the user himself/herself needs to perform setup of various tools, updating of a virus definition, or the like, the operation error is liable to occur. In particular, in the mobile environments, it is also necessary that the encryption key of a wireless LAN be changed or IP addresses of a DNS, a gateway, a proxy, and the like be changed by the terminal itself, and in the change, the operation error is also liable to occur. In the current situation, the security problem adversely affects the mobile environments in that not only the security of the user himself cannot be maintained, but also a damage induced from the virus or the worm is expanded to the network side which offers a service. In the future, the technology and the operation technique for maintaining high security with the enhancement of the user's convenience are requested in the mobile environments that continues to develop widely.

(1) In the wireless LAN which has been developed as one of the access networks, as a technique in which the encryption key setup is automated and the access control of the user is conducted, there is a system using IEEE 802.1x (Network Port Authentication) which is a standard of measure. This is an access control technology that is implemented in a wireless LAN access point or a switch by which the network authenticates the user who has accessed the network by the user authenticator of an ID or an electronic certificate, and only the authorized user is allowed to use the wireless LAN service. Moreover, high security operation can be performed by distributing and updating the encryption key (WEP) of a wireless LAN simultaneously. However, since an encryption algorithm of WEP is vulnerable, and a tool which decrypts the encryption algorithm can be easily obtained, it is very dangerous to use WEP. Although the security function containing IEEE 802.1x is standardized as IEEE 802.11i and a robust encryption algorithm is adopted now, it takes time to spread the encryption algorithm.

(2) Moreover, in order to use the wireless LAN, the user himself/herself is required to set up the access ID (SSID) for distinguishing a wireless LAN network which is different in organization units such as providers. Similarly, user identifiers in turn differ for every organization. Since various kinds of setup by the user is required, while lowering convenience, there is a tendency for a user to set up the same user identifier and the same password easily. Therefore, many setups of the user terminal which is not desirable on security exist potentially. Moreover, SSID can be freely set up by the owner of a wireless LAN access point, and it is possible to readily perform spoofing, with the result that it is very dangerous to use SSID.

In order to eliminate the lowness of the convenience in that the user himself/herself sets SSID to a user terminal for every providers, there is a service in which all access IDs (SSIDs) of the affiliated public wireless LAN services are merged, and a setting list is distributed to a mobile user terminal in advance. In iPass and GRIC which are carrying out a roaming service worldwide, the setting list is held in a connection tool, and during connection with the network, the setting list can be updated automatically. However, more loads are placed on a memory medium of the mobile user terminal, which stores the information of the user terminal, as the number of affiliated services increases. Moreover, because the loads are in turn placed on a server that performs centralized management of the setting lists for automatically updating, considerable management costs are required.

(3) Moreover, in order to use the service by connection with a network, it is necessary to acquire the IP address, DNS server address, gateway address, etc. of the user terminal. As a technique that automates the setup and dynamically distributes the setup, there is DHCP (dynamic host configuration protocol) specified by RFC2131 which is a standard of measure. However, there is no security measures in DHCP, and a malicious user connected with the same subnet can spoof as the DHCP server and distribute an incorrect setup to the user.

Furthermore, in order for a web browser to access a web server, a Mail server, an FTP server, etc. on the Internet or intranet, the web browser may have to go via a proxy server. A proxy server is used to cache a request for accessing the Web server and its response thereto, transfer the request from a large number of clients efficiently, and control the access to the Internet. Since a proxy server is used with various structures according to a setup of a network, a method of load distribution, or the like, it is not easy to set up the network completely according to the situation for every organization. There is WPAD (web proxy auto-discovery protocol) as a technique that automates the setup and dynamically distributes the setup. However, since there is no security measures in WPAD and access by DHCP or DNS is included in the automatic setup, an incorrect setup can be distributed to the user through the spoofing DHC server.

If the mail server or web server to which the user accesses has adopted security of SSL, the possibility of inaccurate relay or tapping by a wireless LAN becomes low, allowing the safe use of a service. However, both of all servers and clients need to comply with those measures, and time is required for perfect spread due to the required costs.

(4) Usually, the mail server or the web server accessed by the user are arranged in networks of an enterprise or a provider which the user made a contract of. In the case where the entire network or an area where the mail server or the web server is located is secure, there is a system using (i) a virtual private network specified by RFC2764 (A Framework for IP Based Virtual Private Networks) which is a standard of measure as a technique that safely accesses a secure area of the network from a network different from the network, and (ii) IPsec specified by RFC2401 (security architecture for the Internet protocol) as a technique that executes the encryption and authentication for guaranteeing the confidentiality and safety of an IP packet, or (iii) IKE specified by RFC2409 (the Internet key exchange) as a key exchange technology for encryption. The application which combines those techniques together is put into a gateway server, which is put at the entrance to a secure area of the network, and the user terminal to thereby realize the access control by user authentication and the safe access to the secure area of the network from the network by encryption of communication information. However, since the user himself/herself is required to set up the IP addresses of the gateway server and the related proxy server, high convenience cannot be obtained.

(5) Moreover, before establishing the secure communication by IPsec, encryption key exchange is performed by IKE. Although the gateway server of the network authenticates the user requesting for the key exchange, since managing agencies differ from each other, the user identifier used for the user authentication at the time of accessing the network generally differs from the user identifier used for the user authentication at the time of connecting with the network. Therefore, a user has to manage at least two or more user identifiers, and convenience becomes low. Moreover, all the users low in security consciousness set up the same user identifier and the same password, and reduce the security of the network.

In this example, when the user authentication is performed by using PKI (public key infrastructure) which is a robust user authentication technology, a damage derived from the leakage of a password can be eliminated. However, even though the same user authenticator is used for the access authentication of an external network and the access authentication to a network, since the same authentication processing is repeated, it takes time to establish the secure communication, and convenience becomes low.

(6) On the other hand, in the iPass which carries out the roaming service, a certain affiliated network is accessed by using one user authenticator (for example, ID/password of the network) among the networks which contain the network a contract of which was made, the user authenticator is roamed, the authentication server of the network which manages the user authenticator makes the authentication authorization, and it is possible to further execute the collective authentication authorization processing and encryption key distribution which is cooperated with the gateway server of the network. However, a specific protocol for gateway servers is used for cooperation between the authentication server of the network and the gateway server. Moreover, the cooperation is restricted to the domain and the system of the same provider. There is no flexibility that can perform an automatic setup safely with respect to the services that are conducted by various providers and systems.

FIG. 22 is a diagram for explaining a method that conducts a remote access to a network of an enterprise which is different in the management unit from the network such as the public wireless LAN from the network of the public wireless LAN in accordance with a conventional art.

The network 102 shown in FIG. 22 is a network 102 that is represented by a public wireless LAN, and a network connection service is offered by the provider. The network 102 is connected to the Internet or the like. Moreover, the public wireless LAN is a communication network of a domain limitation which is built by a wireless LAN or the like, and which is, for example, the network 102 built by the wireless LAN or the like in the office building of a store or an enterprise. Therefore, although the public wireless LAN is under the service of a mobile communication provider, a store or an enterprise makes a contract with the mobile communication provider, and the public wireless LAN is limited in the office building of the store or the enterprise.

Up to now, as shown in FIG. 22, communication providers such as an Internet service provider (ISP) manage the public wireless LAN service and offer the network connection service to the Internet or the like. A DHCP server 104 which distributes the IP addresses of various servers, etc., is installed in ISP. Moreover, a gateway like an IPsec gateway server 108 for accessing a network from the Internet, etc., is installed in the network of an enterprise or the like which is the private network 106. Moreover, a roaming authentication server 112 for roaming a plurality of ISP and performing network access authentication to the public wireless LAN service by one ID/password which is managed by, for example, an enterprise is installed in the roaming network provider (RSP) that is the roaming network 110 such as iPass. Hereafter, a description will be given of a sequence shown in FIG. 23 in a procedure in which the user terminal 114 safely makes access connection to the network of an enterprise or the like safely through the Internet from the public wireless LAN with reference to FIG. 22.

<Connection of Network Link (Layer 2, Data Link): Vulnerability of Encryption Algorithm>

First, a user sets SSID which is the identifier of the public wireless LAN service that has been registered in advance in the user terminal 114 ((2) of FIG. 22), SSID contained in a beacon that is sent from a wireless LAN access point is detected and selected, and network access authentication is started ((3) of FIG. 22). The wireless LAN access point 116 intercepts the communication from the user terminal 114 temporarily, receives the authentication information from the user terminal 114, and validates service use of the user terminal 114 to the ISP authentication server 118 inside ISP ((4) and (5) of FIG. 22). If the user terminal 114 is a roaming user at this time, a roaming authentication request is issued to an enterprise network via RSP, and authentication is conducted by the enterprise authentication server 120 of an enterprise ((6) to (9) of FIG. 22)). If an authentication result is good, the wireless LAN access point 116 releases a network link to the user who has intercepted ((10) to (13) of FIG. 22). Although the data that flows in the link of the wireless LAN is encrypted by WEP, since the encryption algorithm is vulnerable, tapping is possible and the authentication is not safe as security.

<Connection of IP Network: Spoofing>

Next, when the user terminal 114 has completely connected the network link, the user terminal 114 issues a request for acquiring a LAN setting containing IP addresses of the user terminal 114, a DNS server, a gateway which makes connection with the Internet, and the like to the DHCP server 104, and receives a LAN setting ((14) of FIG. 22). The user is not required to designate the IP address of the DHCP server 104 itself and so on in advance. Therefore, when an apparatus which spoofs as the DHC server 104 exists within the same public wireless LAN, tapping, service disturbance, etc. by fraudulent relay are attained, and security cannot be ensured.

<User's Convenience>

Further, in order to begin the secure communication by IPsec to the IP address of the gateway server of a network set to the user terminal 114 in advance, an IKE procedure which is key exchange is started. User authentication for key exchange may be performed in the IKE procedure. Although the IKE itself is a secure protocol, there are a number of procedures for starting a service safely from network access, and the convenience of the user until actually starting a service safely is spoiled. Moreover, in the service offered by the iPass or the like, it is possible for an authentication server and a gateway server to cooperate simultaneously with authentication of network access, and to perform key distribution. However, it is not assumed that the continuous authentication and an automatic setup of a service by two or more providers are conducted prior to starting secure communication with the network. For example, when another independent network 102 has the home agent server of a mobile IP service and the SIP server for a VoIP service, it is not assumed to make all authentications cooperate. In view of this matter, the flexibility of the conventional art is low.

Further, the following is a technique for automatically setting up a known terminal, but such a technique does not solve the problems.

Patent document 1 relates to an address setting method and apparatus. The patent document discloses an IP address automatic setting system to the terminal for an arbitrary MAC address.

[Patent Document 1] JP 11-234342 A

In the conventional system as mentioned above, since the service start procedure of the networks different in the management unit of the providers cannot cooperate with each other, the convenience to the user who wants to use a service safely and early is far from being high. In particular, in order to safely distribute the setup of various services to a user terminal, a measure of establishing a secure route between the user terminal and the respective providers is required. The procedure becomes complicated also in this case, and therefore a user's convenience is spoiled.

SUMMARY OF THE INVENTION

The invention has been made to solve the problems, and therefore has an object to provide an apparatus, method, program, and medium for setting information distribution, an apparatus, method, program, and medium for authentication setting transfer, and a setting information reception program, which cooperate various service requests and the distribution of a setup which are performed independently in a plurality of domains, and improve the user's convenience, and guarantee the correctness of distribution information in each domain.

According to one aspect of the invention, there is provided a setting information distribution apparatus belonging to a first network, characterized by including: authentication unit that receives and authenticates an authentication request from a user terminal which requires an access authentication by using a network access authentication procedure between the user terminal and the first network; transmitting unit that transmits an authentication cooperation request which requires setting data to be set to the user terminal to another network by using the network access authentication procedure and an authentication cooperation procedure between a plurality of networks; and distribution unit that distributes a first response message added with setting data to the user terminal by producing the first response message corresponding to the authentication request by adding the setting data included in a second response message corresponding to the authentication cooperation request.

According to the setting information distribution apparatus of the invention, the setting data of the user terminals which have been generated by a plurality of networks (a plurality of domains), respectively can be finally collectively included in a message of an authentication protocol between the user terminals and the networks. As a result, the setting data of the user terminal to the plurality of networks can be safely distributed to the user terminal during one authentication processing before the user connects with the network. That is, the setting information distribution apparatus of the invention can cooperate distribution of the various service requests and the distribution of the setup, which are performed in the plurality of domains, independently, with each other.

Furthermore, since the authentication cooperation procedure between the plurality of networks is used, the encryption made by the public key of a client or the signature made by each server is included in the message sent mutually between the networks, thereby making tapping and the alteration impossible. Each network domain uses the message extension which can store the setting data so as to safely distribute the setting data which should be set up to a user terminal.

According to another aspect of the invention, there is provided an authentication transfer apparatus, characterized by including: receiving unit that receives a client electronic certificate used for access authentication from a first network that performs an authentication upon receiving an authentication request from a user terminal that requests for the access authentication by using a network access authentication procedure between the user terminal and the first network; and determining unit that determines an authentication cooperation apparatus that is to cooperate with reference to the client electronic certificate that is received by the receiving unit.

According to the authentication setting transfer apparatus of the invention, since cooperation data such as an IP address of the server (authentication cooperation apparatus), which is managed by servers such as an issue server that issues a client electronic certificate and which should carry out authentication cooperation, is referred to, an authentication cooperation apparatus can be efficiently determined in the network access authentication procedure. Moreover, the cooperation data such as the IP address is managed in the database of the authentication server which cooperates, while the IP address, URL, or the like is described directly in the client electronic certificate, or a flag that allows the server to be specified is described indirectly in the client electronic certificate.

According to yet another aspect of the invention, there is provided a setting information reception program for causing a computer to function as: authentication request unit that requests for an access authentication to a first network by using a network access authentication procedure between a user terminal and the first network; receiving unit that receives setting data that is set to the user terminal with respect to another network which is acquired from another network by using the network access authentication procedure and an authentication cooperation procedure between a plurality of networks that cooperate with each other; and setting unit that sequentially sets the setting data received from the receiving unit on the basis of data indicative of cooperation ranking of other networks included in the client electronic certificate.

According to the setting information reception program of the invention, in the case where there are a plurality of networks to be cooperated in authentication with each other, setup is sequentially made on the basis of network information to be cooperated with each other which are indicated by an electronic certificate (data indicative of ranking of the networks to be cooperated with each other). As a result, the user's convenience is improved and the correctness of distribution information can be guaranteed in each domain.

As described above, since the validity of each authentication cooperation message can be verified by verifying the signature made by each of the networks, the user setting information relevant to a service request is safely available from each of the cooperation servers. Moreover, each of the cooperation servers can be so set as to perform a setup for a self-server providing the user terminal with a service in the authentication cooperation procedure between the plurality of networks.

DESCRIPTION OF THE DRAWINGS

FIG. 1 is an explanatory diagram showing a user terminal automatic setting service according to the invention.

FIG. 2 is an explanatory diagram showing a sequence example of the user terminal automatic setting service according to the invention.

FIG. 3 is an explanatory diagram showing a functional block and a system according to the invention.

FIG. 4 is an explanatory diagram showing the details of a TLS protocol (Client Hello).

FIG. 5 is an explanatory diagram showing the details of the TLS protocol (Server Finished).

FIG. 6 is an explanatory diagram showing the detailed example (ISP→RSP) of an SAML protocol (Request).

FIG. 7 is an explanatory diagram showing the detailed example (RSP→enterprise network) of the SAML protocol (Request).

FIG. 8 is an explanatory diagram showing the detailed example (enterprise network→RSP) of the SAML protocol (Response).

FIG. 9 is an explanatory diagram showing the detailed example (RSP→ISP) of the SAML protocol (Response).

FIG. 10 is an explanatory diagram showing the detailed example of an electronic certificate.

FIG. 11 is a flowchart showing an example of an entire processing flow of a security server SS (SS1).

FIG. 12 is a flowchart showing an example of the entire processing flow of the security server SS (SS2).

FIG. 13 is a flowchart showing an example of the entire processing flow of the security server SS (SS3).

FIG. 15 is a flowchart showing an example of the entire processing flow of the security roaming server SRS (SRS2).

FIG. 22 is an explanatory diagram for explaining a user terminal automatic setting service in the conventional art.

FIG. 23 is an explanatory diagram showing an example of a sequence of the user terminal automatic setting service in the conventional art.

DETAILED DESCRIPTION OF THE INVENTION

Figure 14:
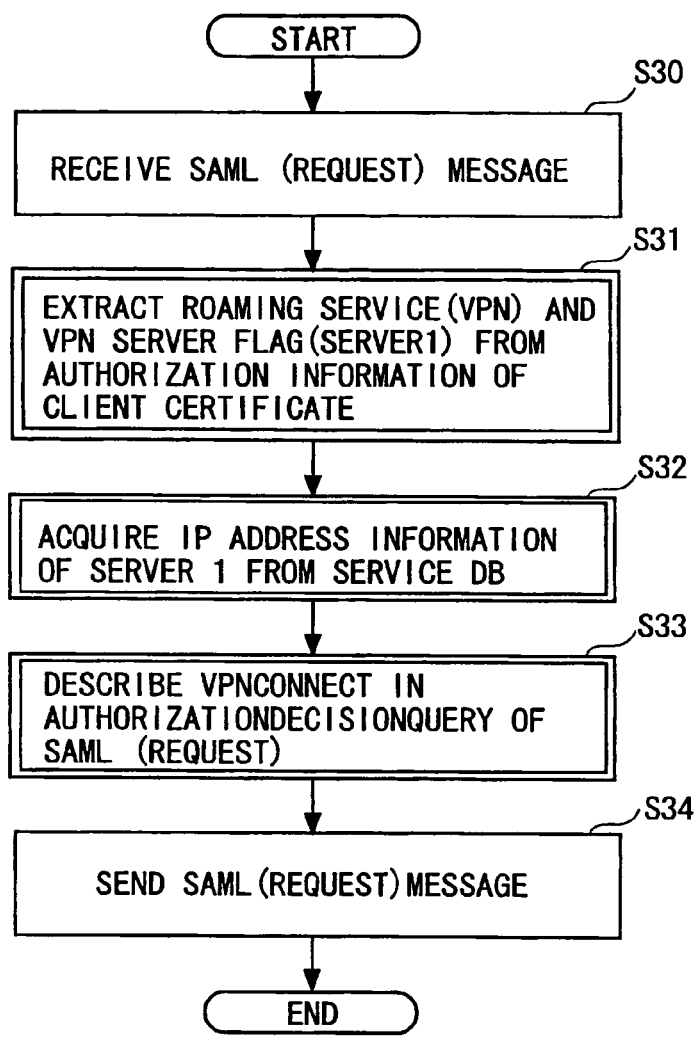
FIG. 14 is a flowchart showing an example of an entire processing flow of a security roaming server SRS (SRS1).

Hereinafter, the best mode for carrying out the invention will be described with reference to the drawings.

<Outline of System Function>

FIGS. 1 and 2 are diagrams each showing an example of a remote access service and an example of a service sequence thereof according to the invention. FIG. 3 is a functional block diagram according to the invention.

Hereinafter, the outline of the system function according to the invention will be described with reference to FIG. 3.

<1. External Network 2>

An external network 2 is an Internet service provider (ISP) which provides all user terminals 4 with IP network services, and offers a wireless LAN access point 6 (WLAN-AP), and so on. Moreover, the external network 2 assigns an IP address to each of the user terminals 4 in order to provide an Internet access service. In general, a DHCP server 8 has a function to dynamically assign the IP address, and a function to distribute a storage destination URL of an automatic setting script such as a proxy server 10. In addition to the functional elements, the external network 2 according to the embodiment includes a security server 12 (SS) that has an authentication function for performing an authentication authorization processing of the user terminal 4 necessary in the case where the user uses the service and an automatic setting function of the user terminal 4.

<2. Private Network 14>

A private network 14 is directed to an organization network for an enterprise, a university, or a government office, which provides a limited number of users with an IP network service, and generally has a VPN gateway server (VPN-GW) 16 for separating the network from a public network like the Internet. Moreover, in order to limit the user terminal 4 which can use the private network 14, the private network 14 has a server having an authentication function. In the embodiment, PKI that is a public key infrastructure is used for authentication, and authentication is performed by using an electronic certificate that is issued to the user. A PKI server 18 (PKI) to be described later is installed in the private network 14 as a management server of PKI, and a VPN gateway server 22 (VPN-GW) that will be described later is installed as a gateway for the user terminal 4 connecting with the private network 14 from the outside by using a VPN protocol 20. The VPN gateway server 22 has a function for authenticating the user with the electronic certificate or the like. FIG. 3 shows a system in which the VPN gateway server 22 is connected to a security roaming network that will be described below so that a mobile user can access indirectly the private network 14. Hereinbelow, for description of an embodiment of the invention, an enterprise network will be described as a representative example of the private network 14.

<3. Security Roaming Network 24>

A security roaming network 24 is a roaming service provider (RSP) which cooperates security including authentication authorization of the plural external networks 2 or the private networks 14. RSP provides a service for executing the verification function of the electronic certificate in the authentication by proxy to guarantee the confidential relation between two or more networks 102 to be roamed. The external network 2 may serve as RSP and a mode of provided service is not limited. In the embodiment, the security roaming network 24 is a network 102 which has the security roaming server 26 (SRS) that will be described later as a server which manages the roaming of security.

<4. User Terminal 4>

The user terminal 4 is made up of four control units described below.

First, (1) an authentication protocol control unit EE28 is called from a network access application used in the case where the user uses a service, and performs the user authentication procedure by the electronic certificate. Next, (2) an automatic setting protocol control unit EE30 is called from the authentication protocol control unit EE28 and performs the setup in various control units on the basis of the automatic setting information (setting data) stored in a response message. Then, (3) a LAN control unit EE32 sets up various IP addresses of the user terminal 4, a gateway server, a DNS server, and a proxy server 10. Furthermore, (4) a security control unit EE34 executes a secure communication with the VPN gateway server 22 on the basis of an encryption key or an authentication key as with a general IPsec client.

<5. Security Server 12>

The security server 12 is made up of four control units described below. First, (1) an authentication protocol control unit SS36 has a user authentication function by the electronic certificate, a verification function to validate the electronic certificate, and an authorization function of a service. Next, (2) an automatic setting protocol control unit SS38 is called from the authentication protocol control unit SS36, and adds the setting information (setting data) collected through the setting control unit for performing the various automatic setup and the cooperating network 102 to the authorization response message which has been extended for distribution to the user. The extended part of the authorization response message is an original extended part according to the invention as shown in FIG. 5. Then, (3) a LAN setting control unit SS40 manages the wireless LAN access point 6 in the external network 2, and the DHCP server 8, and collects appropriate LAN setting according to the situation (for example, the IP address of the user terminal 4, the IP address of the gateway and DNS, a storage destination URL of an automatic setting script file of the proxy server 10, etc.) by using a DHCP protocol etc. Furthermore, (4) an authentication cooperation protocol control unit SS42 notifies the network 102 which should carry out authentication cooperation of the user authentication authorization information on a self-network, and the generated setting, and receives a single sign on authentication result and setting information (setting data) from each of authentication cooperation networks.

<6. DHCP Server 8>

The DHCP server 8 has LAN setting functions (the assignment of a user terminal IP address, the distribution of the IP addresses of the DNS server and the gateway server, the notification of a storage destination URL of the automatic setting script of the proxy server 10) necessary for the user terminal 4 to access the network 102. In the embodiment, the DHCP server 8 is a normal DHCP server 8 that complies with RFC2131 which is a standard of measure, and additionally supports a WPAD function (an option which accesses a storage destination URL of the automatic setting script of proxy server 10) which is normally supported by the DHCP server 8 of Microsoft Corporation. The DHCP protocol 44 is used between the security server 12 and the DHCP server 8.

<7. Security Roaming Server 26>

The security roaming server 26 is made up of two control units and one database which are described below. First, (1) a service database 46 (server DB) determines the IP address of the server (authentication cooperation apparatus) which should carry out authentication cooperation by using the information on a client electronic certificate as a search key. FIG. 3 exemplifies the security server 12, the security roaming server 26, and the VPN gateway server 22 as the authentication cooperation apparatus. (2) An authentication cooperation protocol control unit SRS48 (i) receives a single sign on authentication request and response including the user authentication authorization result and the setting information which have been transmitted from the authentication cooperation protocol control unit SS42 of the security server 12 or the authentication cooperation protocol control unit VPN 50 of the VPN gateway server 22, (ii) determines a server that should be subjected to the authentication cooperation on the basis of the server address information within the client electronic certificate or the service database 46 (service DB), and (iii) forwards the user authentication authorization result and the setting information to the server that has been determined to be subjected to the authentication cooperation. Then, (3) an authentication protocol control unit SRS52 has a user authentication function based on the electronic certificate, a verification function to validate the electronic certificate, and an authorization function of the service.

<8. VPN Gateway Server 22>

A VPN gateway server 22 is made up of two control units described below. First, (1) an authentication cooperation protocol control unit VPN 50 receives the single sign on authentication request including the authentication authorization result and the setting information from each of the authentication cooperation networks such as the security roaming server 26, and transmits a single sign on authentication response including the authentication result and the setting information in the VPN gateway server 22 to the security roaming server 26. Next, (2) a VPN control unit 54 is called from the authentication protocol control unit VPN, performs user authentication, generates and distributes the VPN key that performs the authentication and encryption, and performs access control and encryption communication with the VPN key as in the general VPN gateway server 22. In the embodiment, the VPN gateway server 22 is the VPN gateway server 16 that complies with IPsec specified by RFC2401 (security architecture for the Internet protocol) which is a standard of measure.

<9. PKI Server 18>

A PKI server 18 is made up of a management function that issues and invalidates the PKI electronic certificate, and a PKI database 56 (PKI-DB) which saves the PKI electronic certificate. The form of the electronic certificate is extended to store information indicative of the network 102 which should cooperate in the case of authenticating the user terminal 4 in the form specified by RFC3280 of IETF. In the embodiment, the form of an electronic certificate stores an identification flag indicative of the IP address of the VPN gateway server 22 and the service authorization information indicative of access enable conditions (time, day of the week, etc.).

<10. Single Sign on Protocol 58>

A single sign on protocol 58 is an authentication authorization cooperation protocol used between the security server 12, the security roaming server 26, and the VPN gateway server 22. The single sign on protocol 58 is used to transmit the authentication authorization result and the security setup when the mobile user's user terminal 4 uses the public wireless LAN service. In the embodiment of the invention, the use of SAML which is the typical single sign on protocol 58 is assumed. An information element is described in the SAML response message defined by the SAML protocol in transmission of the security setting information which is needed in the embodiment of the invention. The information element described is information pertained to a VPN setup.

<11. TLS Protocol 60>

A TLS protocol 60 is an authentication protocol that is used between the user terminal 4, the wireless LAN access point 6, and the security server 12. When the user terminal 4 uses the public wireless LAN service, the TLS protocol 60 transmits to the user terminal 4, (i) the client electronic certificate for the security server 12 authenticating a user, (ii) the server certificate for the user terminal 4 authenticating the security server 12 or the wireless LAN access point 6, and (iii) the automatic setting information (setting data). In the embodiment, (i) an EAP-TLS protocol, an EAP-TTLS protocol, and a PEAP protocol which are supported between the user terminal 4 and the wireless LAN access point 6 by IEEE 802.1x are assumed, and (ii) a RADIUS protocol (authentication protocol 62) which includes the EAP between the wireless LAN access point 6 and the security server 12 is assumed. The transmission of the automatic setting information which is required in the embodiment of the invention is realized by using the TLS extension specified by RFC3546 of IETF which is a standardization organization, and separating and describing the information element for a new automatic setup in the extension message for each of networks which cooperate. The information element described is the information (setting data) related to a LAN setting of the IP address etc., and the security setup such as an encryption key which is made by IPsec.

<Remote Access Service Model>

FIG. 1 shows a remote access service model according to the embodiment. This is a service model by which a mobile user belonging to an enterprise using a public key infrastructure (PKI) securely accesses an enterprise network from a plurality of external public wireless LAN services. As a premise, in order that ISP which manages a plurality of public wireless LAN services may be affiliated with RSP which is a roaming provider for authentication roaming and may guarantee a mutual identity, ISP mutually issues the cross certificate that is used by PKI. In order that the enterprise can in turn use a plurality of public wireless LAN services via RSP, the enterprise is affiliated with RSP and mutually issues the cross certificate. The enterprise does not need to be affiliated with the ISP in advance. The model of such PKI is generally called "bridge model". The service sequence according to the invention is shown in FIG. 2. Hereinafter, the details of the embodiment will be described with reference to FIG. 1.

The enterprise has an authentication base by PKI. The PKI server 18 has issued the client electronic certificate for guaranteeing an identity to the users who are employees and various kinds of servers ((1) of FIG. 1). Moreover, an enterprise route certificate for verifying the validity of the electronic certificate in the enterprise is installed in the user terminal 4 as a premise. The enterprise has issued in advance the electronic certificate for remote access authentication to the user who performs external activities such as business. Service authorization information such as remote access service information (a service server identifier, access enable date and hour) and SSID of the public wireless LAN service which has tied up are filled in the electronic certificate. Because the electronic certificate has been signed by an issuer, and the alteration is impossible, the mobile user contrary to the intention of the enterprise can be prevented from using remote access service. Moreover, the electronic certificate is directly stored in the user terminal 4 of the mobile user, or is stored in the user terminal 4 by an external apparatus such as an IC card.

In this case, SSID of the public wireless LAN service within the electronic certificate is extracted by the automatic setting protocol control unit EE30, and is automatically set to the LAN control unit EE32 which controls access to the wireless LAN as a default. Therefore, the user does not need to be conscious of the prior setup.

<Processing of EE0>

Figure 17:
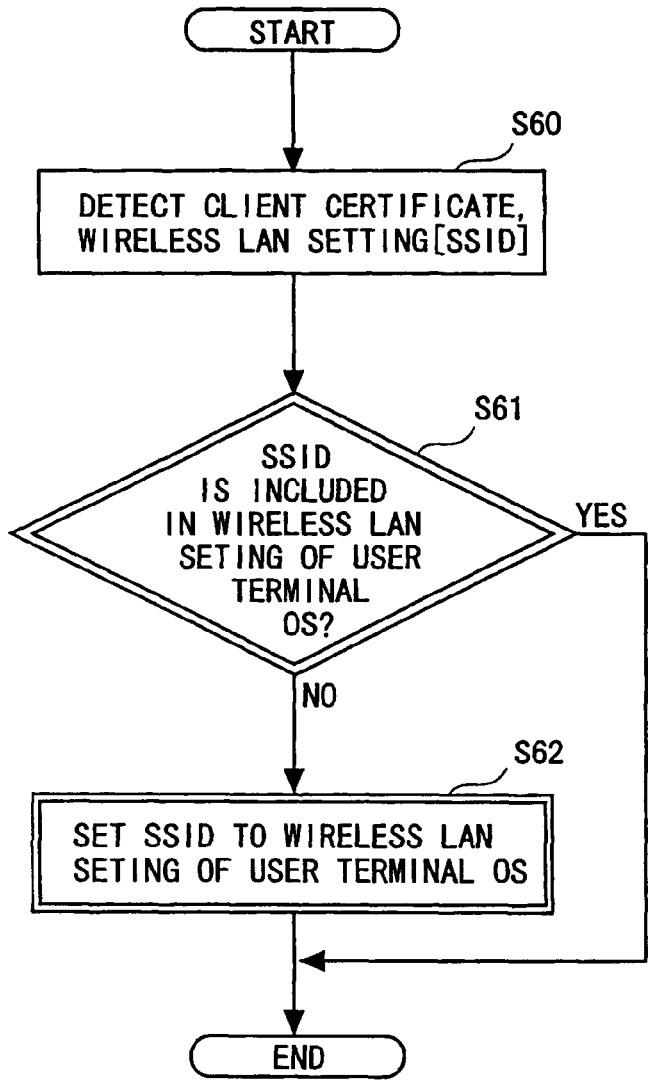
FIG. 17 is a flowchart showing an example of an entire processing flow of a user terminal EE (EE0).

The processing flow of the user terminal 4 is shown in FIG. 17 (EE0). SSID (wireless LAN setting) of the client certificate is detected (S60), and it is judged whether the wireless LAN setting of an operating system (OS) of the user terminal 4 contains SSID which has been detected from the client certificate (S61). When the wireless LAN setting contains SSID, setting processing of SSID is completed. When the wireless LAN setting does not contain SSID, SSID is set to the wireless LAN setting of OS of the user terminal 4 (S62, (2) of FIG. 1).

<Processing of EE1>

Figure 18:
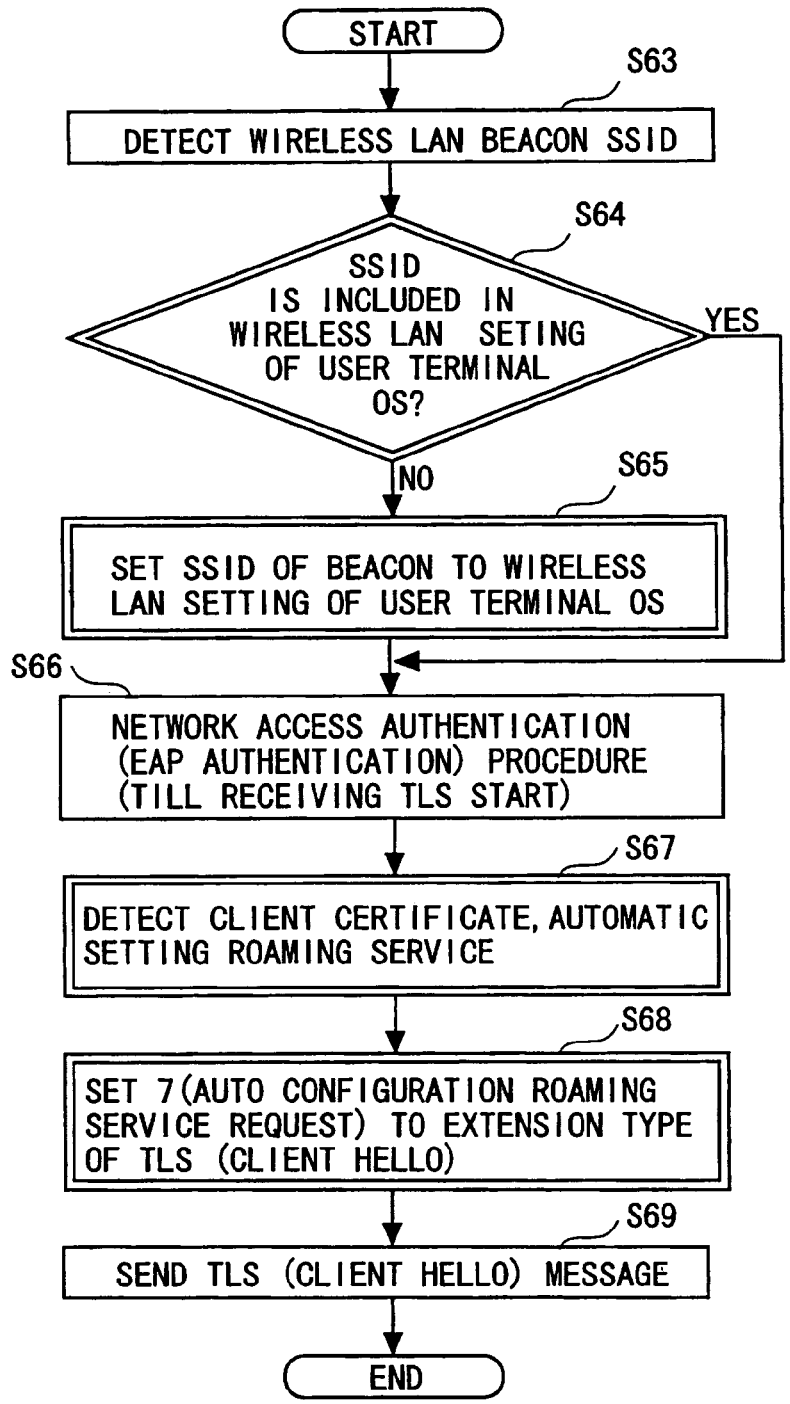
FIG. 18 is a flowchart showing an example of the entire processing flow of the user terminal EE (EE1).

The processing flow of the user terminal 4 is shown in FIG. 18 (EE1). The user terminal 4 detects SSID in the beacon which the wireless LAN access point 6 is sending (S63). It is judged whether a wireless LAN setting of OS of the user terminal 4 contains SSID detected (S64). When the wireless LAN setting contains SSID detected, the user terminal 4 starts a network access authentication (EAP authentication) procedure (S66, (3) to (5) of FIG. 1). This processing is included in general-purpose OS's, such as WindowsXP. When detected SSID differs from a wireless LAN setting of the user terminal 4, the user terminal 4 sets SSID of a beacon as a wireless LAN setting of OS of a client terminal (S65).

Next, when the user terminal 4 receives TLS_start, the automatic setting roaming service of the client certificate is detected (S67), "7" is set to the extension_type of the extended part of TLS (Client Hello) (S68, FIG. 4), and a TLS (Client Hello) message is transmitted to the external network 2 (in the embodiment, the security server 12 through the wireless LAN access point 6) (S69. (3) to (5) in FIG. 1).

<Processing of SS1>

The processing flow of the security server 12 is shown in FIG. 11 (SS1). Next, the security server 12 receives a TLS (Client Hello) message from the user terminal 4 (S1, (5) of FIG. 1). Since the electronic certificate that has been received by the security server 12 is not an electronic certificate issued by ISP, the validity of the electronic certificate is verified by using the certificate verification protocol 64 (SCVP) and inquiring of the authentication protocol control unit SRS52 of RSP about validity (S2). Next, the security server 12 detects an automatic setting roaming service request (extension_type=7) from the extended part of a TLS (Client Hello) message (S3), and judges whether there is a terminal automatic setting roaming function, or not (S4). When there is the terminal automatic setting roaming function (extension_type=7), the server certificate verification data is stored in the area extended in the Server Hello message in the TLS protocol 60, and the TLS (Server Hello) message is safely sent back to the user terminal 4 by using the protection function of TLS (S6, S7). When the automatic setup of the network 102 side cannot be carried out (when the terminal automatic setup roaming function is off), processing is performed on the basis of an authentication procedure NG (S5).

The network access authentication is performed on the basis of standard IEEE 802.1x and the TLS authentication procedure. The wireless LAN access point 6 temporarily intercepts accesses other than the authentication request from the user terminal 4 on the basis of the TLS authentication procedure. The LAN control unit EE32 of the user terminal 4 requires the server authentication from the wireless LAN access point 6, in order to validate the connected wireless LAN access point 6. Under the present circumstances, the wireless LAN access point 6 replaces the request from a user by the RADIUS protocol, and transfers the replaced RADIUS protocol to the security server 12 having the confidential relation by a share key or the like in advance. The authentication protocol control unit SS36 of the security server 12 transmits the server certificate to the user terminal 4 according to the server authentication request.

In order to verify the server certificate it is necessary that the self-certificate (route certificate) of an issue office (CA) which has issued the server certificate be stored in the user terminal 4. Usually, since the route certificate of a typical electronic certificate issue organization such as VeriSign is set to OS of the user terminal 4, or the like in advance, verification can be made by the user terminal 4. In the embodiment of the invention, the authentication protocol control unit SS36 of the security server 12 shown in FIG. 3 supports the TLS extension specified by RFC3546 of IETF which is a standardization organization, verifies a server certificate at the external network 2 side, includes the verification result in the TLS extension, and transmit the message to the user terminal 4. The verification result is confirmed by the authentication protocol control unit EE28 after the LAN control unit EE32 of the user terminal 4 side has received the message, thereby enabling the server authentication. Thereafter, in order to perform the client authentication which asks for authentication authorization to ISP which offers the wireless LAN service, the authentication protocol control unit EE28 of the user terminal 4 transmits the client certificate that has been issued from the enterprise PKI server to ISP ((4) of FIG. 1).

<Processing of SS2>

The processing flow of the security server 12 is shown in FIG. 12 (SS2). The security server 12 which has received the client certificate is authenticated by verifying the client certificate through the authentication protocol control unit SS36, and approves the service (S8, (5) of FIG. 1). Here, since the electronic certificate received from the user terminal 4 is not an electronic certificate issued by ISP, its validity is verified by inquiring of the PKI server 18 of an enterprise about validity through the authentication protocol control unit SRS52 of RSP with the Bridge-CA function of PKI specified to RFC3280 of IETF which is a standard organization by using the certificate verification protocol 64 (SCVP) like a server certificate (S9). The authentication protocol control unit SRS52 of RSP operates as a relay server or a substitute server for verifying the certificate. When RSP holds the lapse information on the electronic certificate managed by the PKI server 18 of the enterprise, the verification of the certificate from the security server 12 is completed only by asking RSP. After verification, the network access authentication at the ISP side is completed.

The authentication protocol control unit SS36 of the security server 12 outputs the authentication authorization result to the automatic setting protocol control unit SS38 (S10). The authentication protocol control unit SS36 directs the LAN setting management part SS from the automatic setting protocol control unit SS38 to obtain a LAN setting containing IP addresses of the user terminal 4, DNS, the gateway, and so from the DHCP server 8, etc., before sending back the authentication result to the user (S11). Then, the automatic setting protocol control unit SS38 judges whether there is the automatic setting roaming service request (extension_type=7) having the fact that the user terminal 4 is requesting a security roaming service, the fact being added to the TLS extension, or not (S12). The automatic setting protocol control unit SS38 asks the authentication cooperation protocol control unit SS42 to collect the setting information on the network 102 which cooperates or on the service by using the authentication cooperation protocol. When the security service/security roaming service request has not been carried out (that is, extension_type is not "6" or "7"), the LAN setting information is stored in an area that is extended within the server finish message in the TLS protocol 60, and then safely sent back to the user by using a protection function of TLS (from S13 to S15).

The authentication cooperation protocol control unit SS42 of the security server 12 judges the network 102 that cooperates or the service with reference to the service authorization information described in the client electronic certificate. In order to collect setting information on them, the security roaming service request including the authentication authorization result of the user terminal 4 and the LAN setting which is setting information on ISP is given to the authentication cooperation server in service authorization information ((8) of FIG. 1). In this example, a roaming service request is given to the security roaming server 26 of RSP which performs these roaming processings together according to the automatic setting service request (extension_type=7, FIG. 4) shown in the TLS extension part. Specifically, using the SAML protocol which is a standard single sign on message, roaming is described to authorization decision query in the SAML request message to provide a service request (S16, FIG. 6). (i) the user authentication authorization information, all the TLS authentication messages, and (ii) the LAN setting information are added to assertion which indicates the network access authentication result in ISP, and those pieces of information are transmitted (from S17 to S19). Moreover, the SAML message contains the client electronic certificate. The SAML message is protected by the electronic signature of ISP, and encryption.

<Processing of SRS1>

Figures 20, 21:
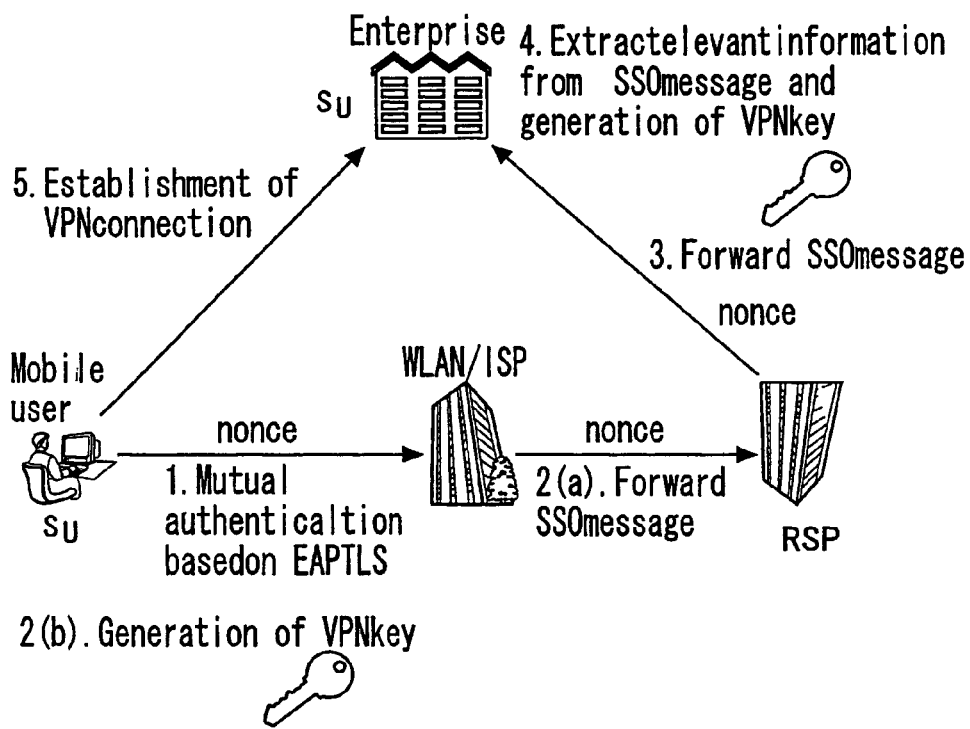
FIG. 20 is an explanatory diagram showing an example of a VPN key generation sequence using an authentication cooperation.
FIG. 21 is a table showing an IP address of the VPN gateway server of an enterprise in a service database.

The processing flow of the security roaming server 26 is shown in FIG. 14 (SRS1). The security roaming server 26 of RSP receives the SAML message which is a security roaming service request in the authentication cooperation protocol control unit SRS48, and confirms the validity of the message by electronic signature (S30). In the authentication cooperation protocol control unit SRS48, cooperation of the specified network 102 and service is started with reference to the service authorization information described by the client electronic certificate contained in the SAML message (S31, (9) and (10) of FIG. 1). Specifically, as shown in FIG. 7, performing VPN to access to the enterprise network is described in the client electronic certificate. The authentication cooperation protocol control unit SRS48 (i) extracts the IP address of the VPN gateway server 22 of the enterprise managed in advance in the service database 46 in RSP from the VPN server flag of the information in the electronic certificate, and (ii) transmits the SAML message including the network access authentication authorization result and the LAN setting information on the user terminal 4 to the VPN gateway server 22, and (iii) issues a VPN connection (key exchange) request (S32 to S34, (10) of FIG. 1). FIG. 21 is a table showing the IP address of the VPN gateway server 22 of the enterprise in the services database 46. The SAML message is protected by the electronic signature of RSP and encryption. Although the network 102 which cooperates is only one of the VPN gateway servers 22 of the enterprise in the embodiment, in the case where a plurality of VPN gateway servers are provided, the security roaming server 26 serves as an center server, and cooperates one by one using an authentication cooperation protocol, thereby allowing cooperation with a plurality of servers. In this situation, the order of cooperating becomes important and is also described in the client electronic certificate, and the directions may be followed. Moreover, when the server is a server (authentication cooperation apparatus) with the authentication cooperation protocol control unit, cooperating in a relay fashion is also possible.

<Processing of VPN>

Figure 16:
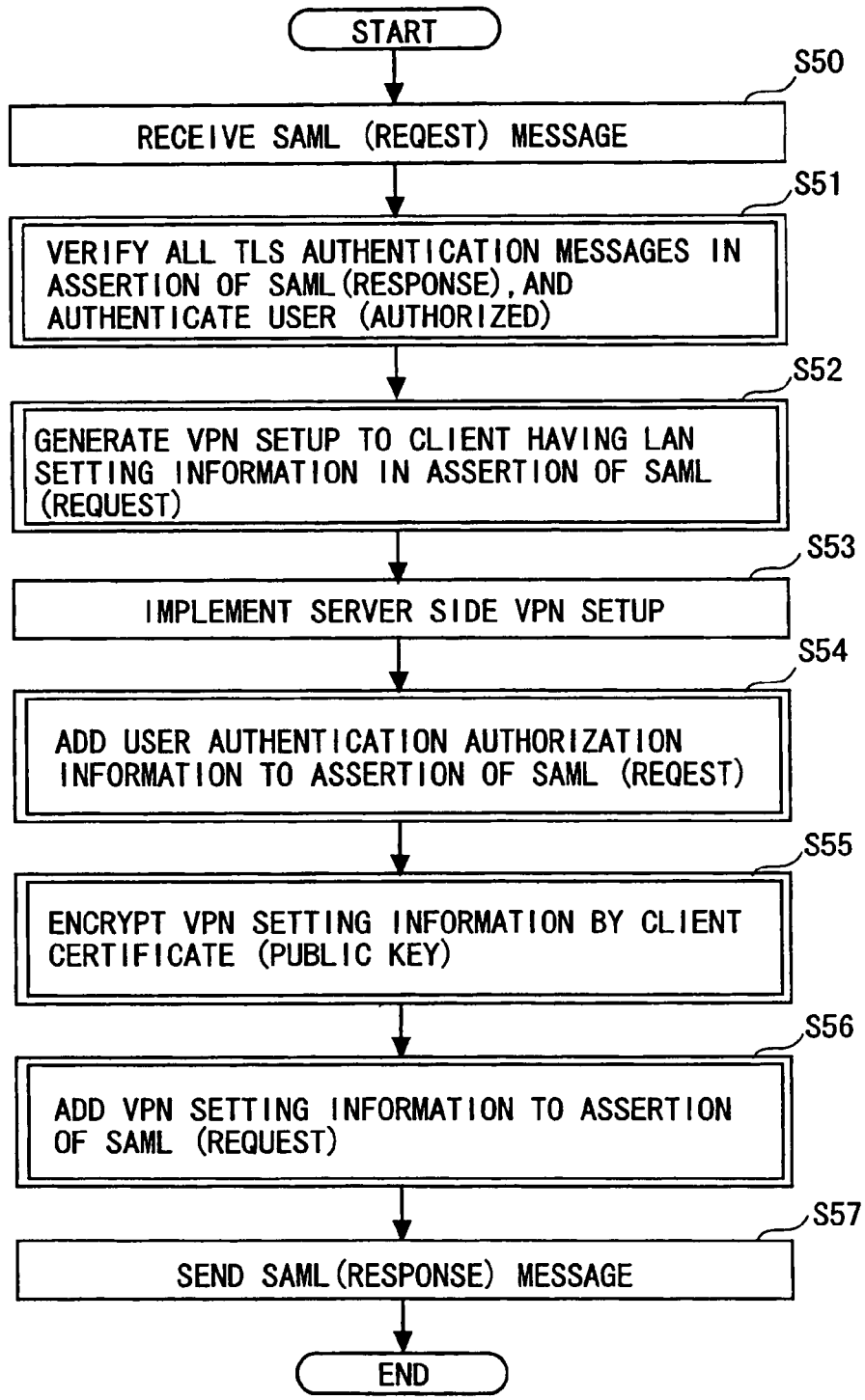
FIG. 16 is a flowchart showing an example of an entire processing flow of a VPN gateway server VPN.

The processing flow of the VPN gateway server 22 is shown in VPN of FIG. 16. The VPN gateway server 22 of the enterprise receives the SAML message which is the VPN connection request shown in FIG. 7 in the authentication cooperation protocol control unit VPN 50, and confirms the validity of a message by electronic signature (S50). In the authentication cooperation protocol control unit VPN 50, user authentication is first performed with reference to the result (Assertion) of network access authentication authorization of the user in response to the VPN connection request shown by the SAML message (S51, (11) of FIG. 1). Next, the key generation and a setup for VPN communication corresponding to the user terminal 4 are required to the VPN control unit 54 with reference to the LAN setting (IP address) information on the user terminal 4 contained in Assertion (S52). The VPN control unit 54 performs a secure communication setup of IPsec etc., and transmits the setup of the security (IP address of the VPN server, the encryption key, and internal IP address of the VPN client, etc.) which is transmitted to the user terminal 4 which is a VPN client side, to the authentication cooperation protocol control unit VPN 50 (S53). The authentication cooperation protocol control unit VPN 50 transmits the SAML response message which includes the security setup and the result of the user authentication authorization by the VPN gateway server 22 in the SAML response message, to the security roaming server 26 of RSP (S54 to S57, FIG. 8 and (13) of FIG. 1). In this situation, security is protected by encrypting the security setup within the authentication authorization result (Assertion) information with a users public key (S55, (12) of FIG. 1). Moreover, the SAML message is protected by the electronic signature of the enterprise and encryption. A processing priority of the information to be set to the user terminal 4 is determined according to the processing priority setting policy that has been classified in advance. The VPN setup obtained from the VPN gateway server 22 is given a priority "A" so that setting processing may be carried out first. When there is setting information about a plurality of services, the setting processing priority of each information is investigated and processing ranking is determined to the information of the same priority on the basis of a predetermined processing ranking setting policy. The values of a processing priority and processing ranking are described in the SAML response message.

<Processing of SRS2>

The processing flow of the security roaming server 26 is shown in FIG. 15 (SRS2). The security roaming server 26 of RSP receives the SAML response message in the authentication cooperation protocol control unit SRS48, and confirms the validity of a message by electronic signature (S35). In the authentication cooperation protocol control unit SRS48, as a response of the security roaming service request from ISP, the information on the SAML response message is succeeded and is transmitted to the security server 12 of ISP (S36 to S40, FIG. 9 and (14) of FIG. 1). The SAML message is protected by the electronic signature made by RSP and the encryption. When the server cooperates with a plurality of networks 102 and there are a plurality of setting information, the result (Assertion) of the authentication authorization including each setting information is arranged in one SAML message one by one, and a response is made.

<Processing of SS3>

The processing flow of the security server 12 is shown in FIG. 13 (SS3). The security server 12 of ISP receives the SAML response message in the authentication cooperation protocol control unit SS42, and confirms the validity of the message by electronic signature (S20). In the authentication cooperation protocol control unit SS42, the security setup and the LAN setting which have been received and encrypted are sent to the automatic setting protocol control unit SS38 in order to transmit those setups to the user terminal 4. The automatic setting protocol control unit SS38 extracts the setting information for every resource within SAML (Response) (S24). Then, the automatic setting protocol control unit SS38 stores the setting information sequentially in the area extended in the Server Finish message in the TLS protocol 60 for every network 102 or service, and responds to the user terminal 4 safely through the authentication protocol control unit SS36 by using the protection function of TLS as a response of network access authentication (S24 to S26, (15) of FIG. 1). When the response of the security service NG is contained in the SAML response message, the user receives a response as a user authentication NG on the basis of the TLS procedure (S22, S23). Moreover, in the case of NG, a request which opens the IP address of the acquired user terminal 4 is given from the automatic setting protocol control unit SS38 to the LAN setting control unit SS40. The TLS message is stored in the RADIUS protocol and transmitted to the wireless LAN access point 6, and the communication which has been interrupted on the basis of the users authentication result is opened in the wireless LAN access point 6. Moreover, information is transferred to the user terminal 4 by using a unit specified by IEEE 802.1x. A processing priority of the LAN setting information to be set to the user terminal 4 by ISP is determined according to the processing priority setting policy that has been classified in advance. In this situation, when the setting processing priority of each information is investigated and the information of the same priority exists, processing ranking is determined on the basis of the predetermined processing ranking setting policy. Moreover, the setting information received by SAML follows the processing priority and processing ranking described in the received SAML message. The values of a processing priority and the processing ranking are described in the priority setup of each TLS extension area.

<Processing of EE2>

Figure 19:
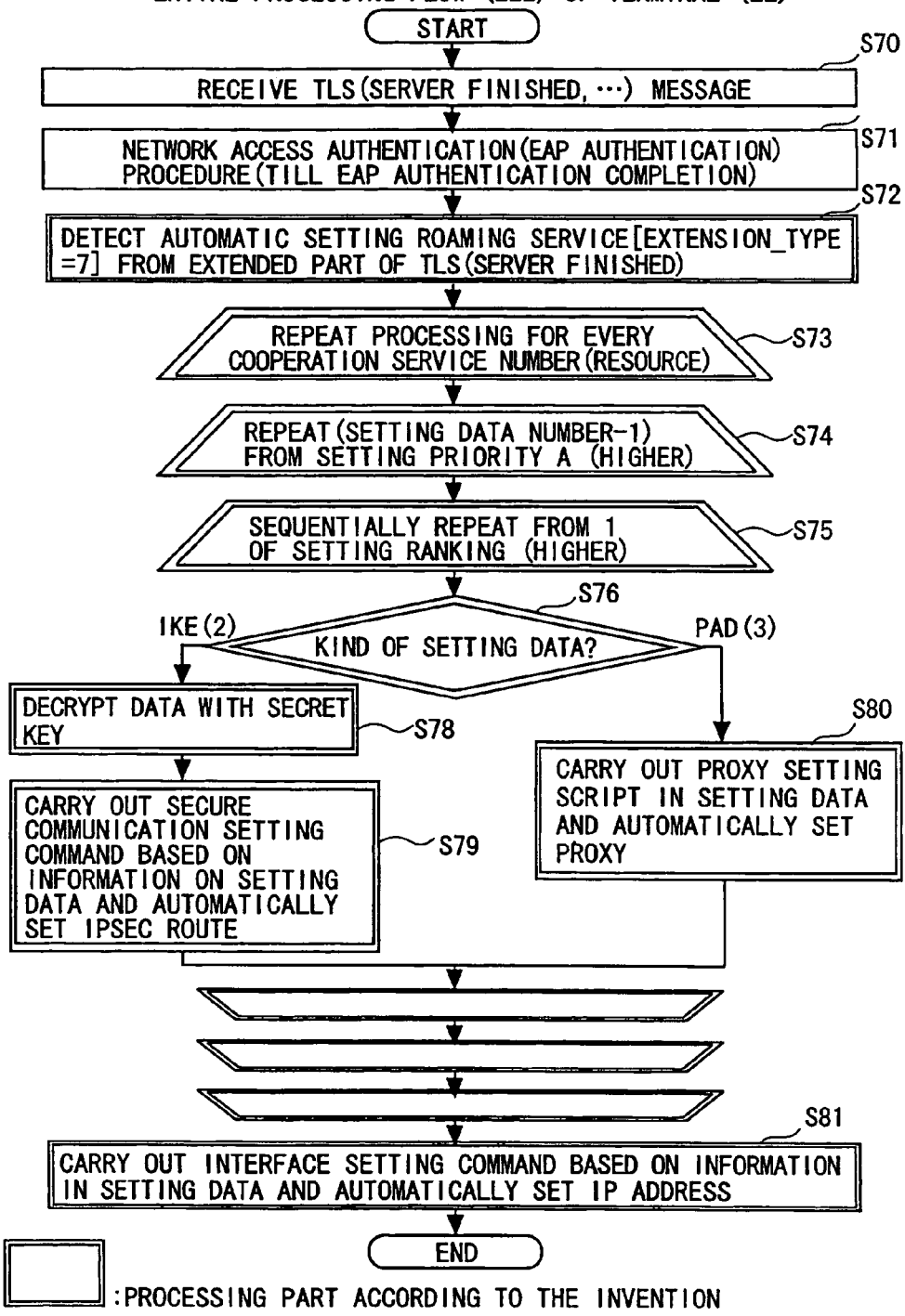
FIG. 19 is a flowchart showing an example of the entire processing flow of the user terminal EE (EE2).

The processing flow of the user terminal 4 is shown in FIG. 19 (EE2). The user terminal 4 receives the TLS message by the authentication protocol control unit EE28, and performs a network access authentication (EAP authentication) procedure till completion (S71). The authentication protocol control unit EE28 detects the automatic setting roaming service (Extension_type=7) from a TLS (Server Finished) extension part (S72). Next, the authentication protocol control unit EE28 transmits the information on a security setup included in TLS extension and a LAN setting to the automatic setting protocol control unit EE30. The automatic setting protocol control unit EE30 processes the setting information that is offered for every network according to the priority described by the client electronic certificate (S73 to S75). In this example, priority is given to the setting processing from the enterprise network, an encrypted security setup is decrypted with a users private key, and transmitted to the security control unit EE34 to automatically perform the secure communication setup of IPsec etc. (S81). Next, setting processing from ISP is performed, the LAN setting of the IP address of the user terminal 4 etc. is transmitted to the LAN control unit, and the communication setup is performed automatically (S81).

With the procedure, the setup for securely communicating on the enterprise network from the user terminal 4 is completed, and secure communication can be conducted immediately after the authentication response of network access.

The examples show the method of distributing the security setup to the user terminal 4 from the VPN gateway server 22 of the enterprise. However, distributing the VPN key information through the network 102 has a risk of leakage, and as its countermeasure, a high processing load on the server is required in the encryption/decryption processing.

<Generation of the VPN Key Using Indefinite Information>

A key generation sequence is shown in FIG. 19. Instead of distributing a VPN key, indefinite information such as random number information and time which is generated at the time of the network access authentication is transmitted to the enterprise network in the authentication cooperation procedure, and the key generation method which generates the same VPN key can be used. The same VPN key can be generated by the server of the enterprise network and the user terminal 4, respectively, by combining the indefinite information, the preset enterprise network, and a user's share key (the key generation method). Specifically, indefinite information is included in the Client Hello message and Server Hello message of TLS among the messages of the TLS authentication procedure which is a network access authentication procedure in ISP. Those messages are included in the message that notifies the VPN server of the enterprise of the authentication authorization result in ISP by the authentication cooperation protocol so as to be distributed in the enterprise network. The server of the enterprise network and the user terminal 4 can respectively generate the same VPN key by a hash function together with the share key which has been encrypted in the electronic certificate.

A TLS message (Client Hello, Server Hello) including the indefinite information is also the information for verifying an authentication authorization result, and the TLS message is dominant information when an enterprise wants to verify the authentication result in ISP. In this example, although a part of TLS message is distributed as the indefinite information, when a high level verification is needed, the message of all the TLS authentication sequences of the network access authentication in ISP maybe included as the indefinite information.

In the VPN service mentioned above, although the IP address of the VPN server, the encryption key, and the internal IP address of the VPN client are distributed to the user terminal 4 as a security setup, it is possible to offer the VPN service that is more safe and small in the server or user terminal processing load by including the VPN key generation unit.

In the embodiment of the invention, in the network connection service from the public wireless LAN, a service automatic setup higher than the IP layer which is provided by the plurality of networks 102 can be performed at the time of completing the network authentication of a link layer that is lower than the IP layer.

According to the invention, it is possible to distribute the respective pieces of setting information collectively to the user terminal 4 in the protected authentication procedure which is conducted when the user terminal 4 accesses to the network 102, and the setup can be efficiently and securely performed between the plurality of networks 102 that provide services which were conventionally offered independently. Since the management of each setting information is performed in distribution by each server, there is realized a system which has a high scalability compared with the case where each setup is managed intensively. Moreover, the validity guarantee by electronic signature etc. and the measure against an information leakage by encryption can be conducted on the messages between the server of each network 102 and a server, and between the server and a client. Therefore, high security can be offered in the embodiment. With the safe and efficient system which automatically sets up the user terminal 4, various setting data can be reliably set to the user terminal 4 before the user starts data communications. Furthermore, not only the user's convenience is enhanced, but also the network 102 side can prevent the security damage attributable to the setting error in the user terminal 4.

An apparatus, method, program, and medium for setting information distribution, an apparatus, method, program, and medium for authentication setting transfer, and a setting information reception program in accordance with the invention cooperate various service requests and the distribution of a setup which are performed independently in a plurality of domains, and they improve a user's convenience, and guarantee the correctness of distribution information in each domain.

What is claimed is:

1. A setting information distribution apparatus belonging to a first network, comprising:
    an authentication unit that receives and authenticates an authentication request from a user terminal which requires an access authentication by using a network access authentication procedure between the user terminal and the first network;
    a transmitting unit that transmits an authentication cooperation request which requires setting data to be set to the user terminal to a second network by using the network access authentication procedure and an authentication cooperation procedure between a plurality of networks including networks using different authentication protocols; and
    a distribution unit that distributes a first response message with setting data to the user terminal by incorporating the setting data corresponding to the authentication request within the first response message and adding the setting data included in a second response message corresponding to the authentication cooperation request, where the user terminal is authenticated based on the first and second response message.

2. A setting information distribution apparatus according to claim 1, further comprising receiving unit that receives the second response message to the authentication cooperation request from another network.

3. A setting information distribution apparatus according to claim 1, wherein the first network has a system capable of using a public key authentication.

4. A setting information distribution apparatus according to claim 1, further comprising issue unit that issues a server certificate signed to protect the user terminal.

5. A setting information distribution apparatus according to claim 1, wherein the second response message is an authentication cooperation protocol including the setting data of the user terminal generated by another network.

6. A setting information distribution apparatus according to claim 1, wherein the electronic certificate includes information related to a plurality of networks that are to cooperate with each other when the plurality of networks that are to cooperate with each other are provided in the authentication cooperation procedure.

7. A setting information distribution apparatus according to claim 6, wherein the information related to the plurality of networks that are to cooperate with each other includes data indicative of ranking with which the plurality of networks are to cooperate for sequentially selecting the plurality of networks that are to cooperate functionally.

8. A setting information distribution apparatus according to claim 2, wherein an SAML protocol specified by OASIS is used as the authentication cooperation protocol which is protected by a signature of the network, and the receiving unit receives the SAML message serving as the second response message in which the setting data of the user terminal generated by another network is embedded in the authentication cooperation procedure that is protected on the basis of the SAML protocol.

9. A setting information distribution apparatus according to claim 1, wherein the setting data includes all data that can be distributed by an Internet key exchange protocol.

10. A setting information distribution apparatus according to claim 1, wherein the setting data includes all data of transport layer security protocol and transport layer security extended protocol.

11. A setting information distribution apparatus according to claim 1, further comprising determination unit that determines the authentication cooperation apparatus that is to cooperate with reference to the electronic certificate used for the access authentication of the user terminal.

12. A setting information distribution apparatus according to claim 11, wherein the authentication cooperation apparatus belongs to another network.

13. A setting information distribution apparatus according to claim 1, wherein the another network is an enterprise network, and the authentication cooperation request that is transmitted to the enterprise network includes a VPN connection request.

14. A setting information distribution apparatus according to claim 13, further comprising receiving unit that receives a VPN key that has been generated in response to the VPN connection request in the authentication cooperation procedure, without operating the key exchange protocol.

15. A setting information distribution apparatus according to claim 13, wherein the transmitting unit transmits indefinite information for generating the VPN key to the enterprise network in the authentication cooperation procedure.

16. A setting information distribution apparatus according to claim 15, wherein the indefinite information is information that is generated at the time of network access authentication.

17. A setting information distribution apparatus according to claim 15, wherein the indefinite information is used by the user terminal to generate the VPN key.

18. A setting information distribution apparatus according to claim 15, wherein the transport layer security protocol is used as the network access authentication procedure, and a random number and a time setup are indefinite information for generating the VPN key.

19. A setting information distribution method, comprising:
receiving and authenticating an authentication request from a user terminal which requires an access authentication by using a network access authentication procedure between the user terminal and a first network;
transmitting an authentication cooperation request which requires setting data to be set to the user terminal to a second network by using the network access authentication procedure and an authentication cooperation procedure between a plurality of networks including networks using different authentication protocols; and
distributing a first response message with setting data to the user terminal by incorporating the setting data corresponding to the authentication request within the first response message and adding the setting data included in a second response message corresponding to the authentication cooperation request, where the user terminal is authenticated based on the first and second response message.

20. A setting information distribution method according to claim 1, further comprising receiving the second response message to the authentication cooperation request from another network.

21. A setting information distribution method according to claim 1, wherein the first network has a system capable of using a public key authentication.

22. A setting information distribution method according to claim 19, further comprising issuing a server certificate signed to protect the user terminal.

23. A setting information distribution method according to claim 19, wherein the second response message is an authentication cooperation protocol including the setting data of the user terminal generated by another network.

24. A setting information distribution method according to claim 19, wherein the electronic certificate includes information related to a plurality of networks that are to cooperate with each other when the plurality of networks that are to cooperate with each other are provided in the authentication cooperation procedure.

25. A setting information distribution method according to claim 24, wherein the information related to the plurality of networks that are to cooperate with each other includes data indicative of ranking with which the plurality of networks are to cooperate for sequentially selecting the plurality of networks that are to cooperate functionally.

26. A setting information distribution method according to claim 20, wherein an SAML protocol specified by OASIS is used as the authentication cooperation protocol which is protected by a signature of the network, and
the receiving includes receiving the SAML message serving as the second response message in which the setting data of the user terminal generated by another network is embedded in the authentication cooperation procedure that is protected on the basis of the SAML protocol.

27. A setting information distribution method according to claim 19, wherein the setting data includes all data that can be distributed by Internet key exchange protocol.

28. A setting information distribution method according to claim 19, wherein the setting data includes all data of transport layer security protocol and transport layer security extended protocol.

29. A setting information distribution method according to claim 19, further comprising determining the authentication cooperation apparatus that is to cooperate with reference to the electronic certificate used for the access authentication of the user terminal.

30. A setting information distribution method according to claim 29, wherein the authentication cooperation apparatus belongs to another network.

31. A setting information distribution method according to claim 19, wherein the another network is an enterprise network, and the authentication cooperation request that is transmitted to the enterprise network includes a VPN connection request.

32. A setting information distribution method according to claim 31, further comprising receiving a VPN key that has been generated in response to the VPN connection request in the authentication cooperation procedure, without operating the key exchange protocol.

33. A setting information distribution method according to claim 31, wherein the transmitting includes transmitting indefinite information for generating the VPN key to the enterprise network in the authentication cooperation procedure.

34. A setting information distribution method according to claim 33, wherein the indefinite information is information that is generated at the time of network access authentication.

35. A setting information distribution method according to claim 33, wherein the indefinite information is used by the user terminal to generate the VPN key.

36. A setting information distribution method according to claim 33, wherein transport layer security protocol is used as the network access authentication procedure, and a random number and a time setup are indefinite information for generating the VPN key.

37. A computer-readable storage medium having stored therein a setting information distribution program for causing a computer to execute an operation, comprising:
   receiving and authenticating an authentication request from a user terminal which requires an access authentication by using a network access authentication procedure between the user terminal and the first network;
   transmitting an authentication cooperation request which requires setting data to be set to the user terminal to a second network by using the network access authentication procedure and an authentication cooperation procedure between a plurality of networks including networks using different authentication protocols; and
   distributing a first response message with setting data to the user terminal by incorporating the setting data corresponding to the authentication request within the first response message and adding the setting data included in a second response message corresponding to the authentication cooperation request, where the user terminal is authenticated based on the first and second response message.

38. A computer-readable storage medium according to claim 37, further comprising receiving unit that receives the second response message to the authentication cooperation request from another network.

39. A computer-readable storage medium according to claim 37, wherein the first network has a system capable of using a public key authentication.

40. A computer-readable storage medium according to claim 37, further comprising issue unit that issues a server certificate signed to protect the user terminal.

41. A computer-readable storage medium according to claim 37, wherein the second response message is an authentication cooperation protocol including the setting data of the user terminal generated by another network.

42. A computer-readable storage medium according to claim 37, wherein the electronic certificate includes information related to a, plurality of networks that are to cooperate with each other when the plurality of networks that are to cooperate with each other are provided in the authentication cooperation procedure.

43. A computer-readable storage medium according to claim 42, wherein the information related to the plurality of networks that are to cooperate with each other includes data indicative of ranking with which the plurality of networks are to cooperate for sequentially selecting the plurality of networks that are to cooperate functionally.

44. A computer-readable storage medium according to claim 38, wherein an SAML protocol, specified by OASIS is used as the authentication cooperation protocol which is protected by a signature of the network, and the receiving unit receives the SAML message serving as the second response message in which the setting data of the user terminal generated by another network is embedded in the authentication cooperation procedure, that is protected on the basis of the SAML protocol.

45. A computer-readable storage medium according to claim 37, wherein the setting data includes all data that can be distributed by Internet key exchange protocol.

46. A computer-readable storage medium according to claim 37, wherein the setting data includes all data of transport layer security protocol and transport layer security extended protocol.

47. A computer-readable storage medium according to claim 37, further comprising determination unit that determines the authentication cooperation apparatus that are to cooperate with reference, to the electronic certificate used for the access authentication of the user terminal.

48. A computer-readable storage medium according to claim 47, wherein the authentication cooperation apparatus belongs to another network.

49. A computer-readable storage medium according to claim 37, wherein the another network is an enterprise network, and the authentication cooperation request that is transmitted to the enterprise network includes a VPN connection request.

50. A computer-readable storage medium according to claim 49, further comprising receiving unit that receives a VPN key that has been generated in response to the VPN connection request in the authentication cooperation procedure, without operating the key exchange protocol.

51. A computer-readable storage medium according to claim 49, wherein the transmitting unit transmits indefinite information for generating the VPN key to the enterprise network in the authentication cooperation procedure.

52. A computer-readable storage medium according to claim 51, wherein the indefinite information is information that is generated at the time of network access authentication.

53. A computer-readable storage medium according to claim 51, wherein the indefinite information is used by the user terminal to generate the VPN key.

54. A computer-readable storage medium according to claim 51, wherein transport layer security protocol is used as the network access authentication procedure, and a random number and a time setup are indefinite information for generating the VPN key.

55. A storage medium which is readable by a computer and stores a program for causing the computer to function as:
   an authentication unit that receives and authenticates an authentication request from a user terminal which requires an access authentication by using a network access authentication procedure between the user terminal and the first network;
   a transmitting unit that transmits an authentication cooperation request which requires setting data to be set to the user terminal to a second network by using the network access authentication procedure and an authentication cooperation procedure between a plurality of networks including networks using different authentication protocols; and
   a distribution unit that distributes a first response message with setting data to the user terminal by incorporating the setting data corresponding to the authentication request within the first response message and adding the setting data included in a second response message corresponding to the authentication cooperation request, where the user terminal is authenticated based on the first and second response message.

* * * * *